US008745920B1

(12) United States Patent
Mills

(10) Patent No.: US 8,745,920 B1
(45) Date of Patent: Jun. 10, 2014

(54) PROTECTIVE DEVICE FOR PLANTS, SEEDLINGS, AND TREES

(76) Inventor: Thomas Mills, Lafayette, IN (US)

(*) Notice: Subject to any disclaimer, the term of this patent is extended or adjusted under 35 U.S.C. 154(b) by 296 days.

(21) Appl. No.: 13/155,644

(22) Filed: Jun. 8, 2011

Related U.S. Application Data

(60) Provisional application No. 61/352,511, filed on Jun. 8, 2010.

(51) Int. Cl.
*A01G 13/02* (2006.01)
(52) U.S. Cl.
USPC .............................................. 47/29.6; 47/31.1
(58) Field of Classification Search
USPC ................ 47/20.1, 23.1, 23.2, 29.6, 29.7, 30, 47/31.1, 44, 47
IPC .......................... A01G 13/02,13/00, 7/08, 17/06
See application file for complete search history.

(56) References Cited

U.S. PATENT DOCUMENTS

| 59,967 | A | 11/1866 | Clymer | 47/23.2 |
|---|---|---|---|---|
| 116,974 | A | 7/1871 | Mayfield | 47/30 |
| 183,879 | A | 10/1876 | Ackley | 47/30 |
| 195,913 | A | 10/1877 | Antisdale | 47/30 |
| 361,241 | A | 4/1887 | Rugg | 47/3 |
| 592,640 | A | 10/1897 | Orner | 47/30 |
| 645,518 | A | 3/1910 | Watt | 47/30 |
| 1,098,586 | A | 6/1914 | Oters | 47/30 |
| 1,207,039 | A | 12/1916 | Rabus | 47/30 |
| 1,299,870 | A | 4/1919 | Stevenson | 47/30 |
| 1,321,747 | A | 11/1919 | Ireland | 47/31.1 |
| 1,423,659 | A | 7/1922 | Hassel | 47/30 |
| 1,485,924 | A | 3/1924 | Hobbs | 47/31 |
| 1,690,716 | A | 11/1928 | Brisbois | 47/30 |
| 1,875,533 | A | 9/1932 | Weaver | 47/32.4 |
| 2,006,562 | A | 7/1935 | Scheu | 47/2 |
| 2,141,486 | A | 12/1938 | Piglia | 47/3 |
| 3,218,759 | A | 11/1965 | Barrons | 47/30 |
| 3,657,840 | A | * 4/1972 | Benoist | 47/41.01 |
| 3,816,959 | A | 6/1974 | Nalle | 47/32.4 |
| 4,018,003 | A | 4/1977 | Mirecki | 47/31.1 |
| 4,700,507 | A | 10/1987 | Allen | 47/32.4 |
| 4,899,486 | A | * 2/1990 | Hurlstone | 47/30 |
| 5,090,155 | A | * 2/1992 | Rodgers | 47/30 |

(Continued)

FOREIGN PATENT DOCUMENTS

CH             631865          *  9/1982

OTHER PUBLICATIONS

Translation of CH 631865.*

*Primary Examiner* — David Parsley
*Assistant Examiner* — Thien Thanh Pham

(57) ABSTRACT

Disclosed is a plant protection device that combines the functionality of a solid walled style plant protector that is good for the establishment of a new plant/seedling and perforated style plant protector that is good for an established plant. The wall of a tree/plant protector and growth device has thin areas inherent in the wall that degrade faster than other parts of the same device wall. This occurs based on the weather conditions (wind/rain/cold), UV degradation, biodegradation, and other factors. Over time these areas open up, allowing air, sun light and other environmental elements to reach the plant/tree within the protector. Strategically placing the thinner areas allows for designs for different plant/tree species and applications. Applications for climatic regions—northern, aired, wetlands, etc. Other applications examples are reforestation, vineyards, windbreaks, etc. The degradation of the thin areas can be controlled by using different materials, UV stabilizer levels and other methods.

19 Claims, 26 Drawing Sheets

(56) References Cited

U.S. PATENT DOCUMENTS

| | | | |
|---|---|---|---|
| 5,323,566 A | 6/1994 | Mills | 47/30 |
| 5,347,750 A * | 9/1994 | Mills | 47/30 |
| 5,375,368 A | 12/1994 | Motz | 47/30 |
| 5,479,741 A | 1/1996 | Underwood | 47/30 |
| 5,513,466 A | 5/1996 | Mercier | 47/73 |
| 5,692,337 A * | 12/1997 | Motz, Jr. | 47/30 |
| 5,809,690 A | 9/1998 | Due | 47/30 |
| 5,813,170 A * | 9/1998 | Friesner et al. | 47/31.1 |
| 5,930,948 A | 8/1999 | Daniel | 47/23.1 |
| 5,974,729 A | 11/1999 | Clark | 47/24.1 |
| 6,378,459 B1 | 4/2002 | Potente | 119/57.9 |
| 6,588,144 B1 | 7/2003 | Staggs | 47/30 |
| 2002/0032983 A1 | 3/2002 | Weder | 47/30 |
| 2003/0208953 A1 | 11/2003 | Mccamy | 47/23.2 |
| 2004/0049976 A1 * | 3/2004 | Maffei | 47/20.1 |
| 2004/0200141 A1 * | 10/2004 | Whitcomb | 47/32.7 |
| 2004/0244284 A1 * | 12/2004 | Voehringer | 47/23.1 |
| 2006/0032116 A1 * | 2/2006 | Milliken | 47/21.1 |
| 2009/0272031 A1 * | 11/2009 | Lais et al. | 47/29.1 |

* cited by examiner

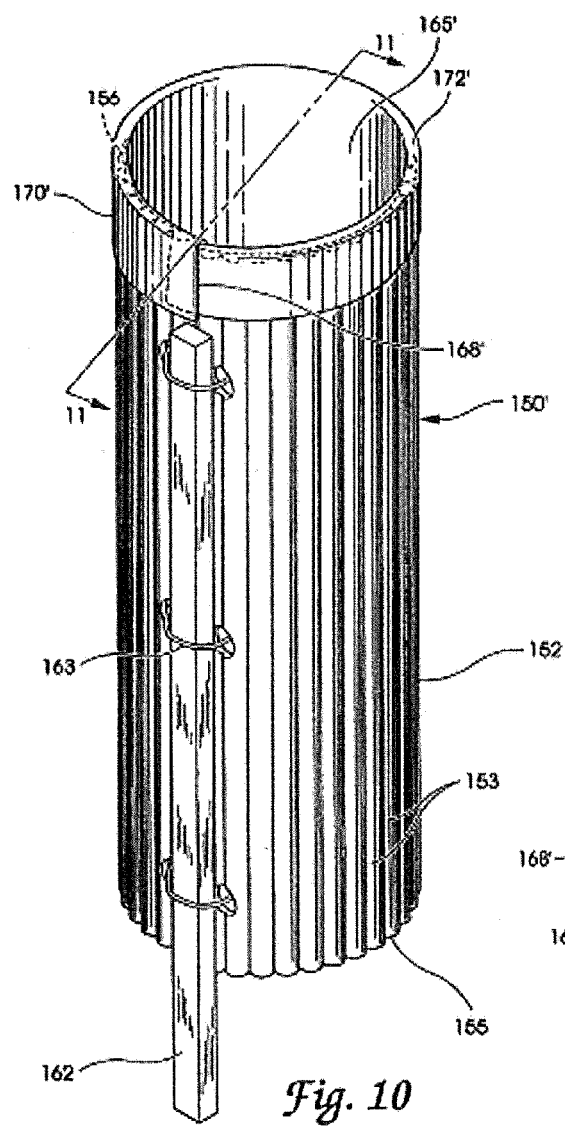
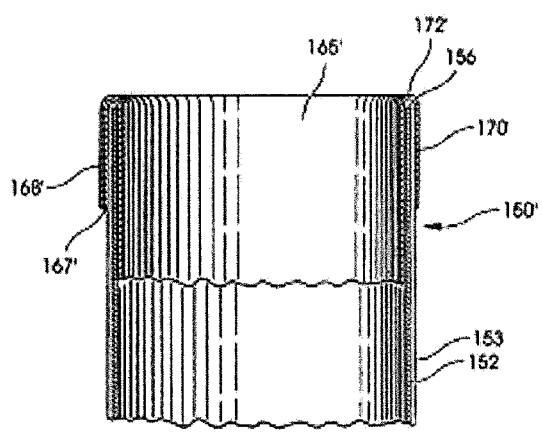
Fig. 10
Fig. 11

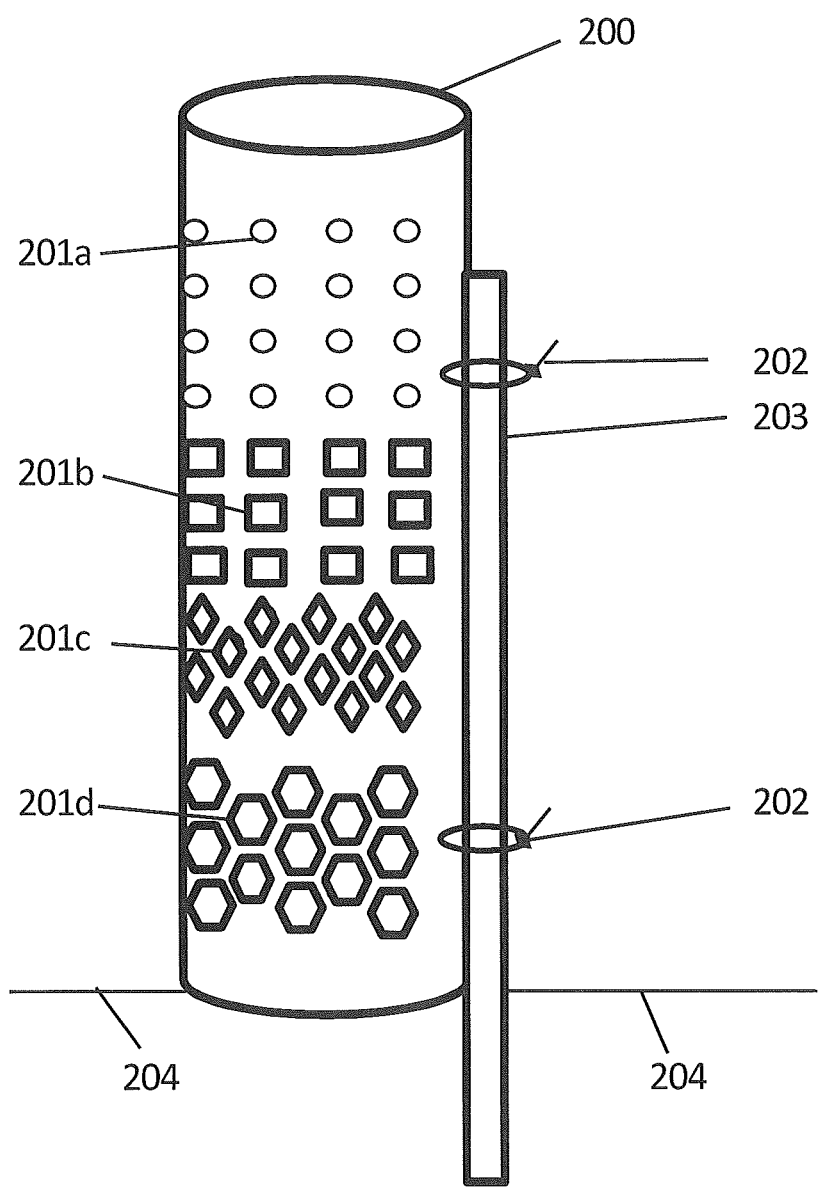

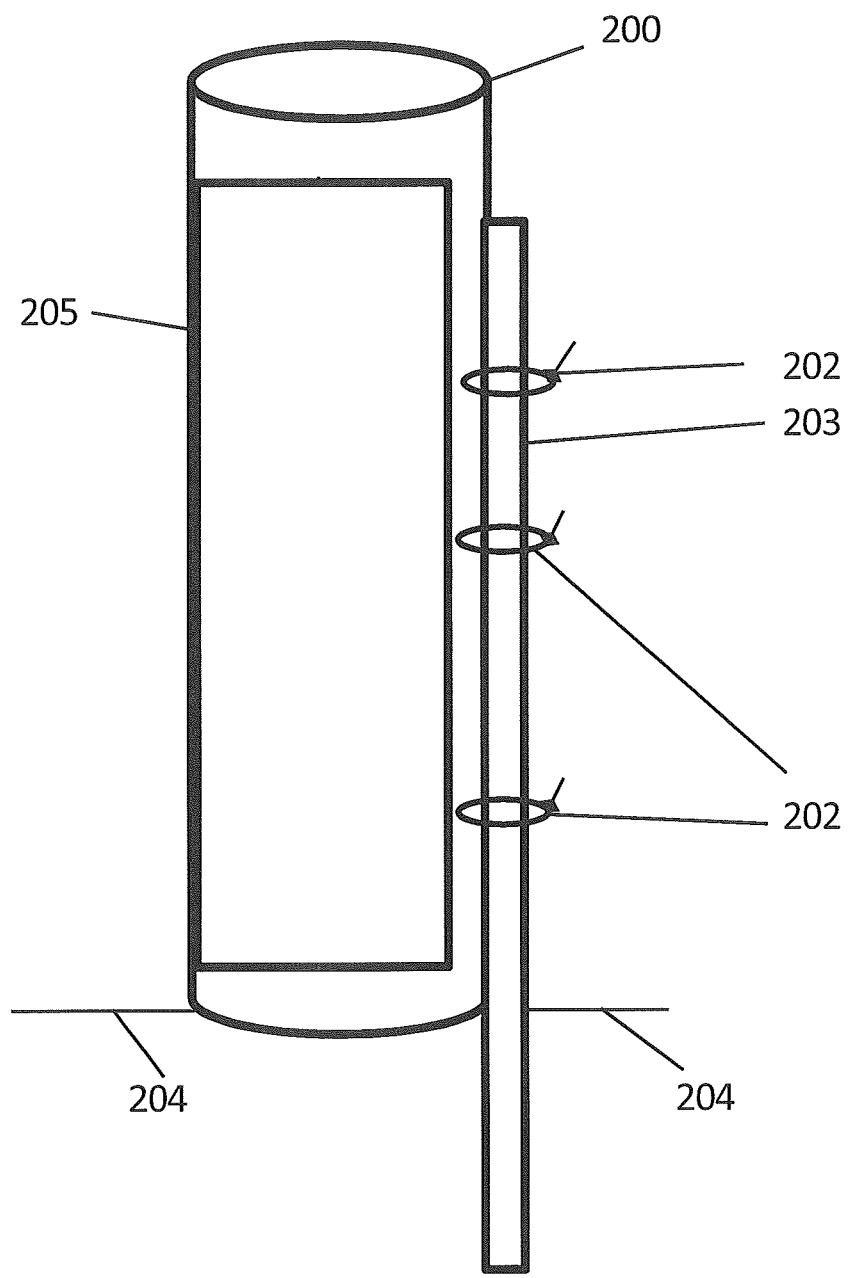

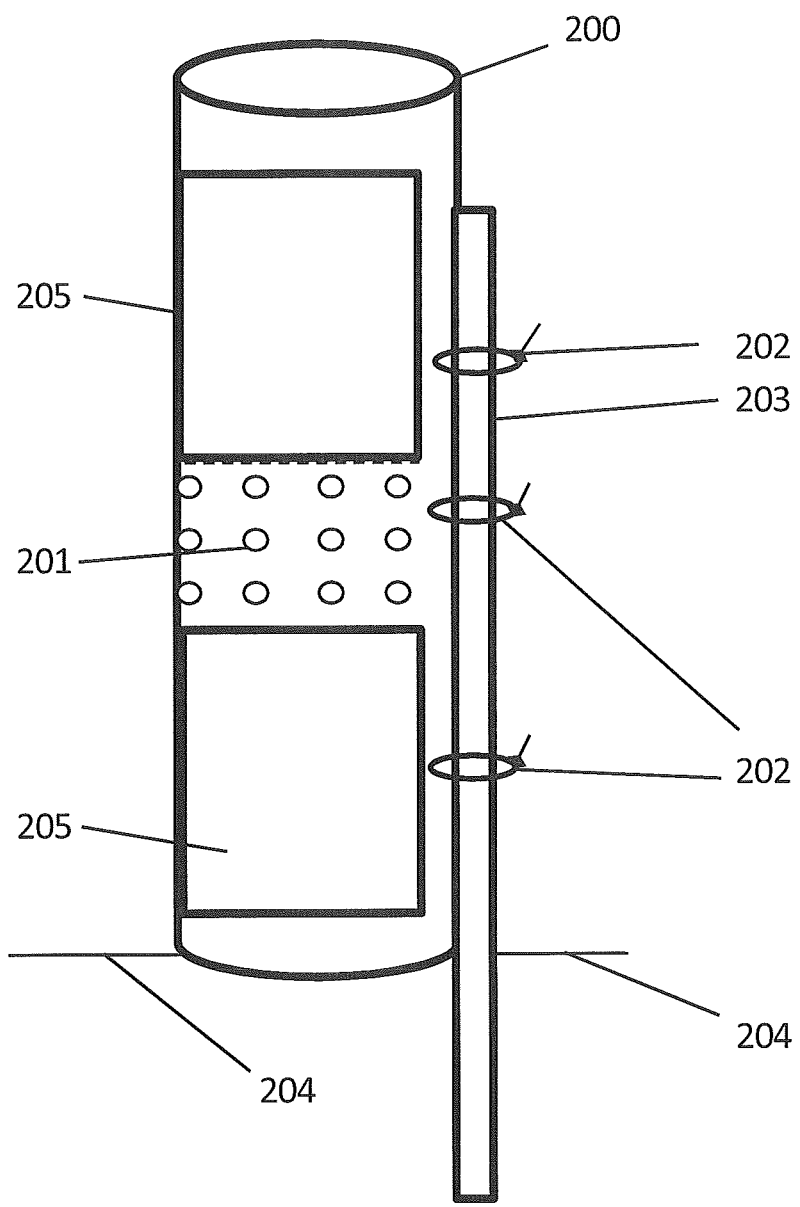

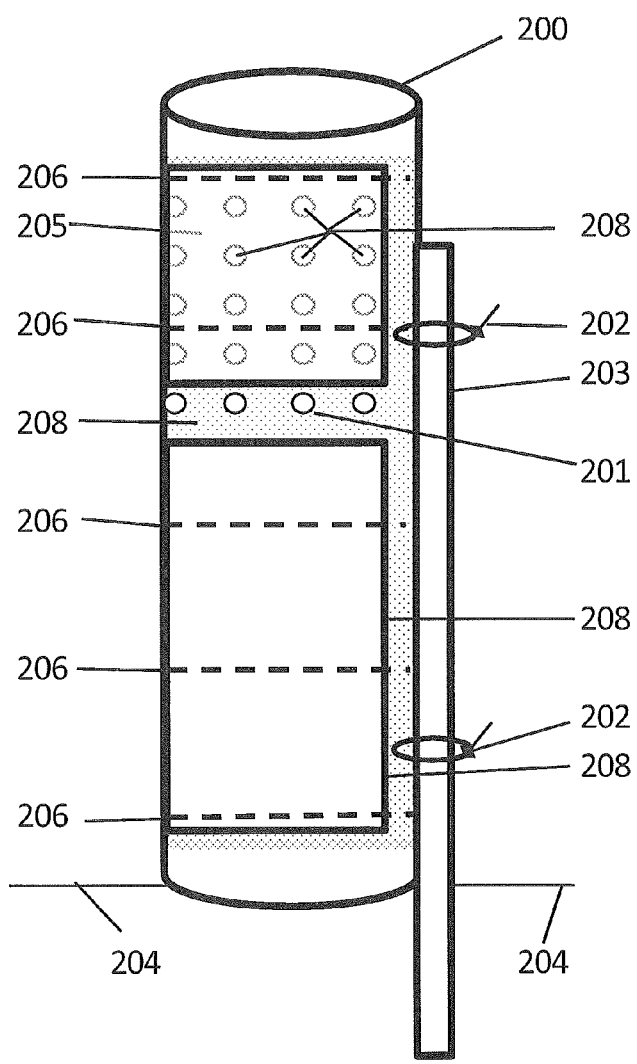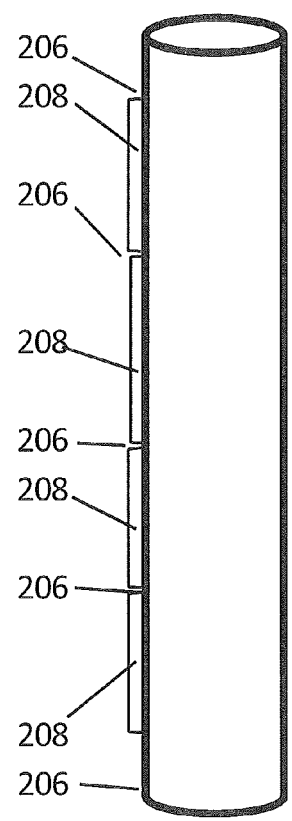

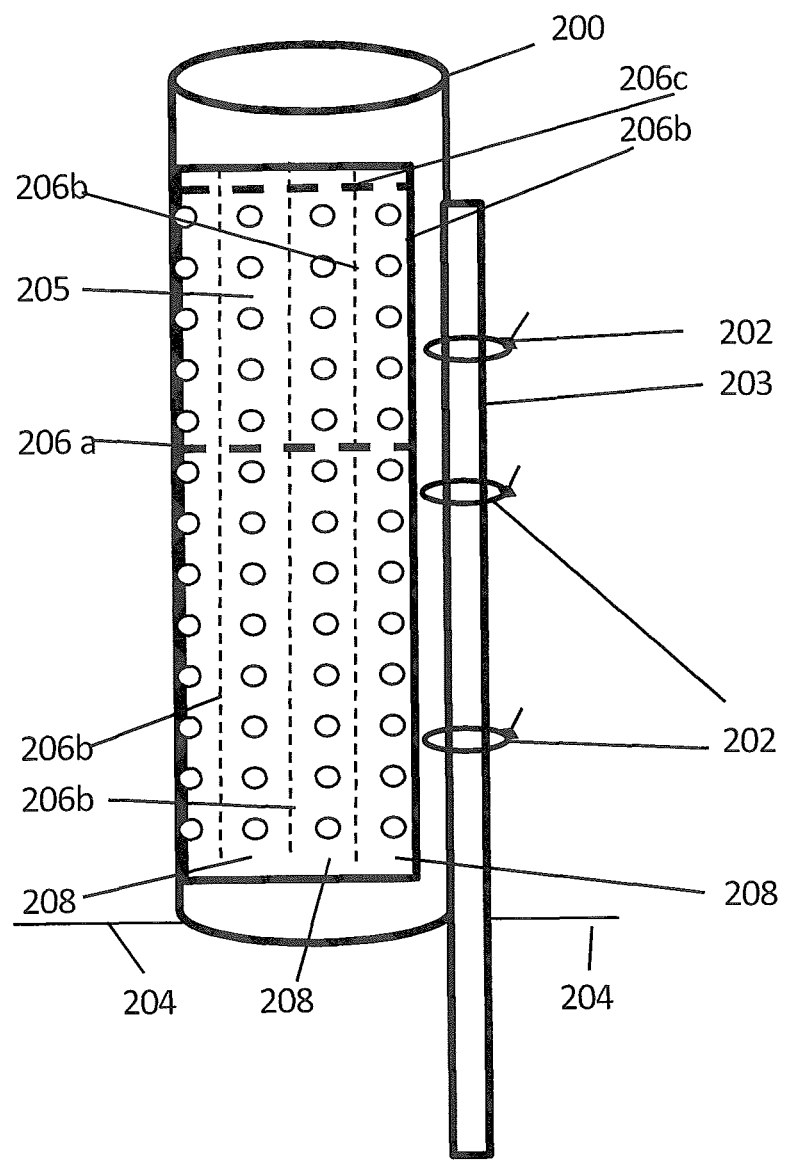

PROTECTIVE DEVICE FOR PLANTS, SEEDLINGS, AND TREES

CROSS REFERENCE TO PENDING APPLICATION

This application claims priority to U.S. provisional patent application Ser. No. 61/352,511 entitled "Protective device for plants, seedlings, and trees" filed Jun. 8, 2010 by Thomas Mills, the contents of which are herein incorporated by reference.

FIELD OF THE INVENTION

This invention relates generally to the field of plant protectors which are placed around a plant to provide protection and a favorable growing environment for plants, such as trees.

BACKGROUND OF THE INVENTION

Plant protectors are used to protect young trees and other types of plants from foraging animals, such as rabbits, rodents and deer. They are also useful for retaining water vapor, thereby increasing the humidity near the plant to create a favorable sheltered growing climate inside the plant protector.

A plant protector may also raise the temperature of the sheltered climate around the plant, which is especially beneficial during colder spring months. Use of a plant protector may protect the plant from early spring cold spells, lengthen the growing season and increase the rate of growth. The increased growth is beneficial to reforesting or orchard operations. Plant nurseries may also benefit from the increased plant growth which often occurs with the use of plant shelters. However, elevated temperatures in the sheltered climate may cause problems in the fall months by delaying when the plant goes dormant. Thus, the plant protector optimally is removed or is vented to lower the temperature surrounding the plant.

The current protectors are good for the establishment of either a new plant/seedling (solid walled style plant protector) or for an established plant (perforated style plant protector). Most applications require both styles during the establishment of a plant. It is expensive to purchase and install both styles over the plant establishment period of 5 to 7 years. The solid walled is used for the first 2 to 3 years. Then the first protector is removed and a perforated/mesh/fence style is installed in its place. Traditionally, customers make a decision to use one or the other.

U.S. Pat. No. 4,899,486 to Hurlstone relates to a tree shelter having an elongated tubular body including a longitudinal channel or groove for receiving a stake and which is open at opposing ends. The device is formed of unperforated plastic material which allows light to pass therethrough. Hurlstone contemplates a continuous walled tubular body so that it lacks any capacity for enlarging the diameter of the tubular body. The Hurlstone device is further limited in application because of the inherent difficulty of placing a closed cylinder over plants having spreading branches.

Other types of plant protectors include U.S. Pat. No. 3,816,959 to Nalle which discloses a plant protector having tubular mesh to prevent plants from being damaged by animals. However, this particular device provides little favorable sheltered climate effect due its use of open tubular mesh which permits circulation of air therethrough.

U.S. Pat. No. 4,700,507 to Allen discloses a tree bark protector made from high impact polyurethane plastic molded into half sections which can be fitted over the base portion of a tree trunk where it widens into the soil. The Allen device includes ground engaging anchors for a bottom flange. The facing edges of the half sections accommodate molded locking connectors in enlarged or swollen portions.

U.S. Pat. No. 1,875,533 to Weaver discloses a tree protector formed from concrete which rests on the surface of the ground and surrounds the base of a tree. The disclosed apparatus includes three longitudinal solid sections of identical size and shape secured in assembled relation by wires.

SUMMARY OF THE INVENTION

The wall of a tree/plant protector and growth device has thin areas inherent in the wall that degrade faster than other parts of the same device wall. This occurs based on the weather conditions (wind/rain/cold), UV degradation, biodegradation, and other factors. Over time these areas open up, allowing air, sun light and other environmental elements to reach the plant/tree within the protector. Strategically placing the thinner areas allows for designs for different plant/tree species and applications. Applications for climatic regions—northern, aired, wetlands, etc. Other applications examples are reforestation, vineyards, windbreaks, etc. The degradation of the thin areas can be controlled by using different materials, UV stabilizer levels and other methods.

Consumers have two types of devices to protect plants, seedlings and trees from deer, rodents, weather, people, etc—Solid or perforated/mesh/fence walled plant protectors. Solid wall protectors are best for new plantings of young plants and seedlings, while the perforated/mesh or fence walled protectors are better for the tree/plants once the plant is older, above the browsing stage of its development.

The solid protectors produce an environment that completely shelters the plant from animals and the environmental elements, while creating an environment inside the protector that increases growth and improves form. It is beneficial to have a small level of venting in the solid wall plant protectors. A key feature of this device is a venting system build into the design of the device while it is in the solid wall stage.

The perforated/mesh/fence products protect the trunk or base of the plant while allowing the environmental elements such as air, wind, rain, sun, etc through to the plant. In this stage of the plants life, it still needs limited protection, but needs to be exposed, so the plant can acclimate itself to the elements and not allow mold and fungus to develop as can happen with solid tubes.

A purpose of this device is to bridge the gap between the two plant protector's styles. This device starts off as a solid wall protector and over time due to the thinner areas built into the walls of the device degrading, opening up, and allowing a free exchange of air from the outside elements to enter the device. The device physically changes over time from a solid walled device into a perforated/mesh/fence device. This eliminates the need to purchase and install two separate protection devices during the 5 to 7 years it can take to establish a plant or tree.

Another aspect of this protection and growth device is that this design can be applied to any tree protector design (a flat sheet of any dimensions that can be rolled/shaped into a tube/cylinder or a tube/cylinder manufactured of any material) regardless of the material used in the production, protector style or shape, manufacturing technique, or any other criteria in the production or use of plant protector. This is an improvement on the plant protectors/shelter/grow tubes already on the market.

A second feature to this device is a design that reduces the material needed to produce a plant protector by reducing the wall thickness of the center section of the plant protector. For a protector with a flexible sheet having a height of at least 1 foot, such as a 48 inch protector, the top 4 inches and bottom 4 inches would have a wall thickness great enough to hold the ties in place to keep the device attached to the support stake. The use of other materials can also have the same effect. The remaining 40 inches in the center is made of a thin material. Sample wall thickness differences could be—30 mil 4 inch top and bottom rings verses a 3 mil 40 inch center sections. This reduces the overall weight without losing functionality.

BRIEF DESCRIPTION OF THE DRAWINGS

FIG. 10 is a side view of a modification to the embodiment of FIG. 9 shown with the inner liner folded over the top of the outer liner.

FIG. 11 is a partial cross-sectional view of the plant protector shown in FIG. 10, taken along lines 11-11 as viewed in the direction of the arrows.

FIG. 15 is a side view of the skeleton of a plant protector apparatus having flexible ties engaged but not tightened about a support stake, thus illustrating the relationship of the side edges, the apertures, the ties and the stake prior to tightening the flexible ties. It also shows examples or the ventilation holes shapes and positioning.

FIG. 16 is a side view of the apparatus in FIG. 15 with the degradable skin covering the ventilation holes.

FIG. 17 is a side view of the apparatus in FIG. 16 with a section of the skin removed showing that the ventilation holes are under the skin.

FIG. 18 is a side view of the apparatus in FIG. 16 with a section of the skin removed showing the path air is allowed to flow in and out of the device. It illustrates one way to attach the skin to the skeleton creating these paths.

FIG. 19 is a side view of the apparatus in FIG. 18. It illustrates an alternative attachment pattern of the skin to the skeleton creating different paths for the air to transfer in and out of the device. It also illustrates the ventilation controls available with this attachment technique.

FIG. 24 also illustrates an optional collar that can be placed on the top rim to protect the plant as it emerges out of the device.

DETAILED DESCRIPTION

Figure 1:
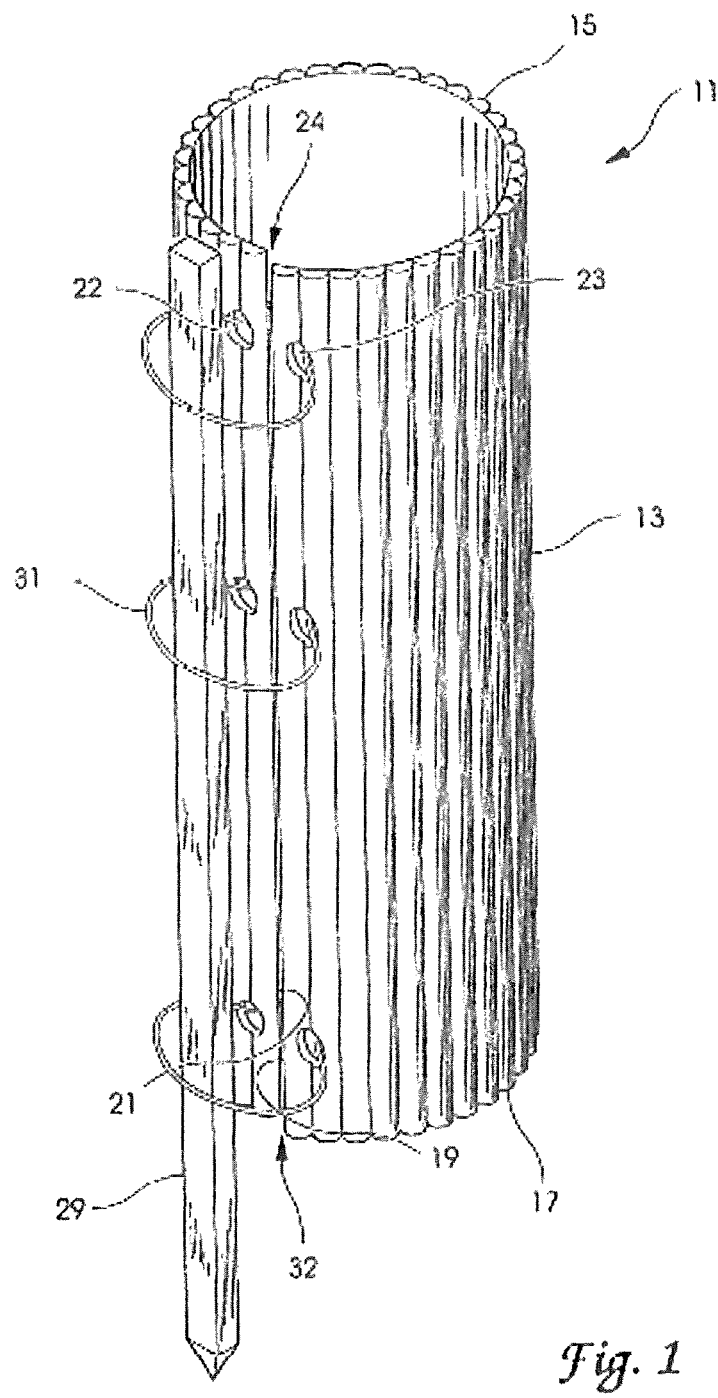
FIG. 1 is a side view of a plant protector apparatus having flexible ties engaged but not tightened about a support stake, thus illustrating the relationship of the side edges, the apertures, the ties and the stake prior to tightening the flexible ties.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1-4, a plant protector apparatus 11 is illustrated which comprises a resilient polymeric sheet 13 having a top edge 15, a bottom edge 17, and two side edges 19 and 21. The apparatus also includes a number of apertures 22 and 23 defined in matching pairs at the opposite side edges 19 and 21, respectively. These matched apertures 22 and 23 can be aligned such that an aperture on one side edge 19 has a corresponding aperture on the other side edge 21 when the sheet 13 is formed into a cylinder 24. The apertures 19 and 21 are offset from their respective side edges so that the edges may overlap, as shown by side edge overlap 27 in FIG. 3.

The apparatus also includes a stake 29, or vertical support for anchoring the apparatus to the ground. A number of flexible ties 31 extend through the matching apertures 22 and 23 and around the stake 29 to secure the side edges 19, 21 and stake 29 to one another. The ties 31 are tightenable to force the side edges into overlapping relation and to press the stake 29 against the overlap 27, thereby sealing the edges and forming a cylinder 24 around the plant to be protected. A preferred side edge overlap is about one inch, which requires a stake 29 having a comparable width.

Figure 2:
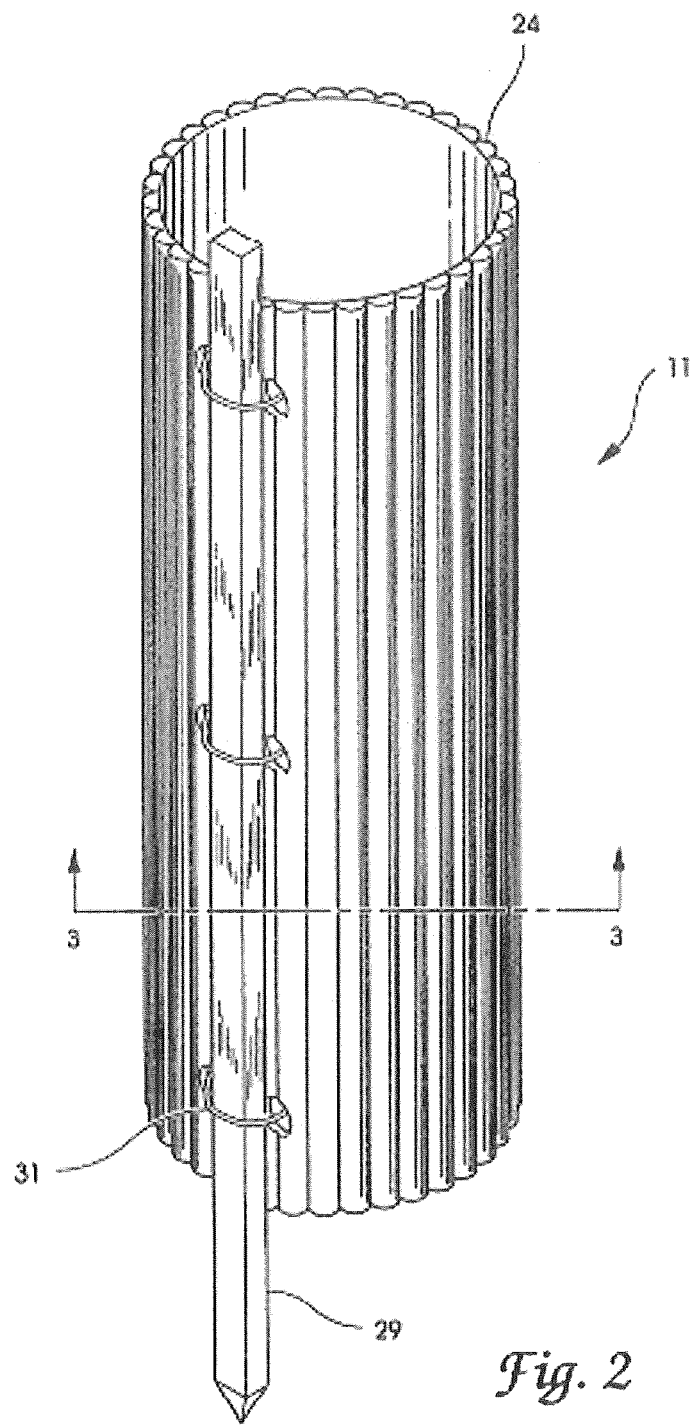
FIG. 2 is a side view of the apparatus in FIG. 1 with the ties tightened about the stake.
Figure 3:
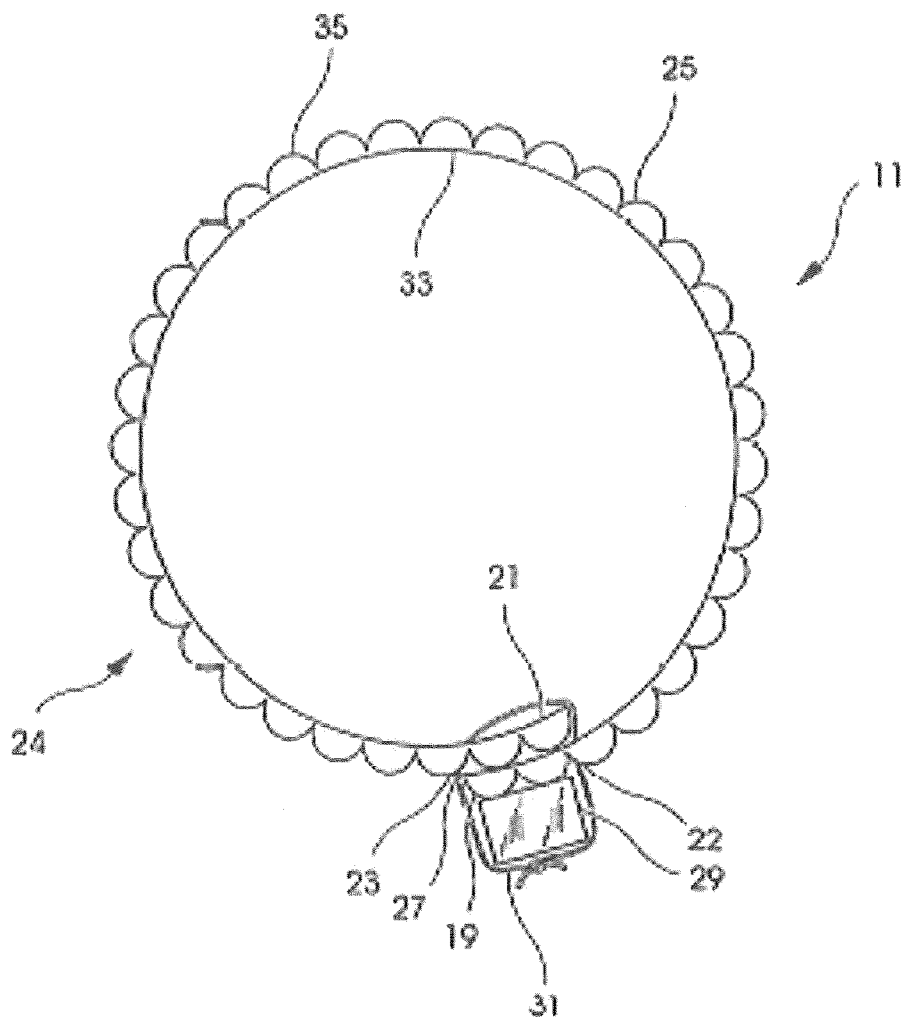
FIG. 3 is a cross-sectional view of the apparatus in FIG. 2 showing the overlapping side edges tightened against the stake and showing the inner substantially smooth layer and the outer corrugated layer.

FIG. 1 illustrates the flexible ties 31 passing through the matching apertures 22 and 23 and around the stake 29 but not yet tightened. FIGS. 2 and 3 illustrate the normal operating position of the apparatus in which the flexible ties 31 are tightened to secure the edges and stake together thereby forming a seal along the overlap 27. The ties 31 can be of the type such that the ends can be twisted together, such as ends 32, to tighten the ties about the stake.

Figure 4:
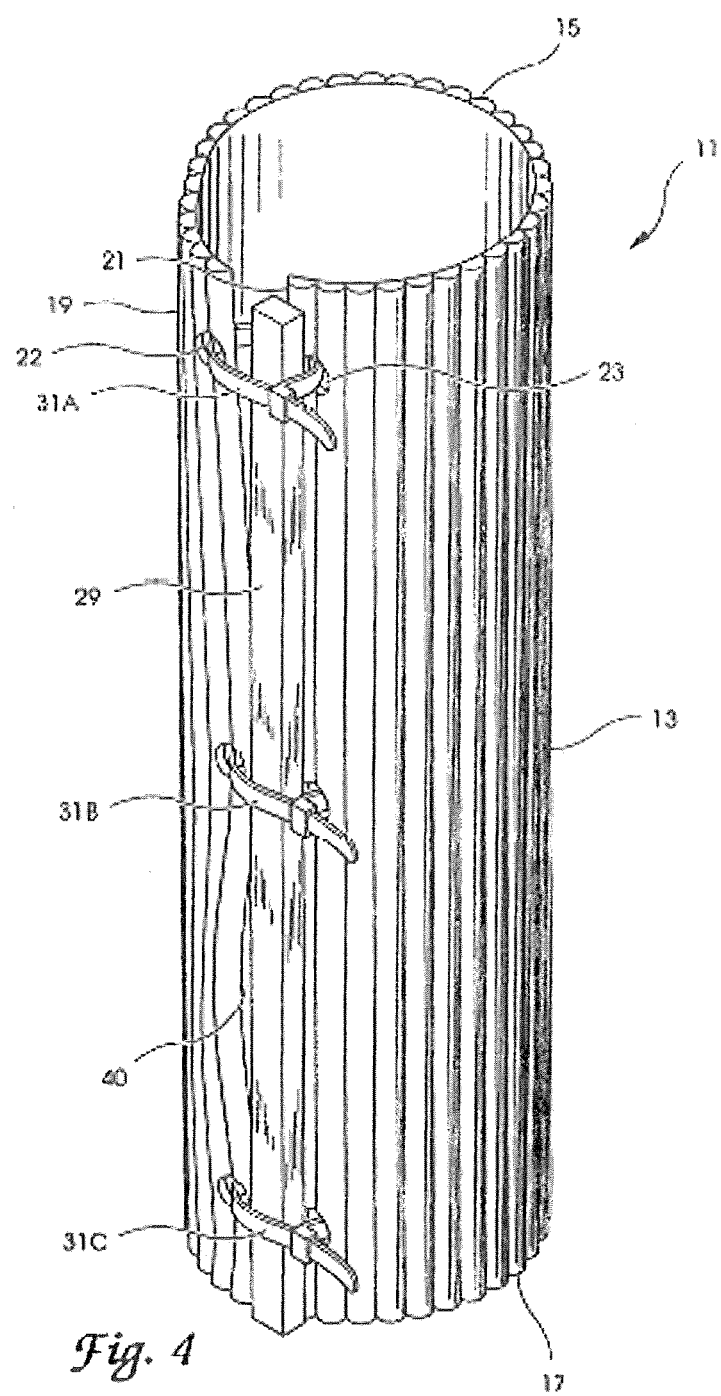
FIG. 4 illustrates a side view of the apparatus in FIG. 1 having a "window" formed.

FIG. 4 illustrates apparatus 11 having a "window" 40 which includes all of the features described in FIGS. 1-3. In this embodiment, the ties 31 can be of a known flexible interlocking type, such as an electrical cable tie. The plant protector apparatus 11 is shown with three ties, 31A, 31B and 31C which can define a "window" 40 while maintaining a rigid connection to the stake. This is accomplished by loosening the top tie 31A and middle tie 31B, pulling the side edge 19 over the stake 29. The bottom tie 31C is left tight leaving a portion of the side edge 19 near the bottom edge 17 located adjacent to the side edge 21 while the remaining portion of the outer overlapping edge is positioned adjacent to the stake 29 so that the stake is between both side edges 19 and 21 above the lower tie 31C and tightening the top tie. An alternative method for venting the plant protector apparatus 11 includes loosening the middle tie 31B, separating side edge 19 from side edge 21 and inserting a wedge or stake between the side edges thereby maintaining a ventilation opening.

Preferred materials for the resilient sheet 13 include polyethylene and polypropylene, although alternative polymers may be used. It is also contemplated that bubble pack sheet material, single layer sheets, polymeric foams and sheets of treated cellulose or other similar materials can be used as long as they are flexible and are substantially resistant to decay from the elements. It is contemplated that the polymeric sheets permit passage of light there through, although alternative embodiments may include opaque polymeric sheets and the use of color to absorb or reflect certain frequencies of light to modify the heat generated. The plant protector can also be composed of a biodegradable material that does not require removal after use.

An especially preferred material for the sheet 13 is a multiple ply resilient polymeric sheet which includes a substantially smooth inner ply or layer 33 and corrugated outer ply 35, as shown in FIG. 3. It is contemplated that the material of both sheets be of sufficient gauge to weigh about 90 to 150 pounds per thousand square feet, the preferred weight of material being 130 pounds per thousand square feet. A variety of corrugation patterns and sheet gauges may be used to vary structural characteristics and resiliency of the sheet 13 for the desired application. The two layers 33 and 35 are preferably bonded together. The corrugated ply 35 includes grooves 36 that extend longitudinally along the sheet. One advantage of lamination of corrugated outer layer 35 and smooth inner layer 33 is realized in an increase in strength and rigidity of the assembled apparatus 11. The substantially smooth inner layer 33 also helps protect the plant from damage by chaffing.

The flexible ties 31 may be locking nylon ties, metal wire, rope or cloth ties. Adhesive tape may also be used to seal and adhere the side edges to one another. It is also contemplated that the side edges 19 and 21 can be heat sealed together during manufacture or after placement around the plant. The stake 29 may be formed of wood, metal, plastic or other suitable materials for anchoring an apparatus to the ground. Although a single stake is generally used, larger cylinders or protectors placed in areas of higher winds may use multiple stakes for added security. It is preferred that multiple stakes be secured by ties passing through matching apertures at other locations around the circumference of the apparatus 11.

Advantages of the plant protector include being able to open the side edges to allow ventilation to permit the plant to become dormant in the fall and to prevent overheating in warm climates. The plant protector apparatus allows the venting of the air around the plant by loosening the flexible ties and separating the side edges. This allows air to mix and pass through the tree protector to lower the temperature and humidity in a manner similar to how a greenhouse is ventilated.

The use of a flexible sheet offers significant advantages over a sealed or continuous cylinder. Many plants or trees to be protected have spreading branches which make placement of a continuous cylinder around the plant more difficult. This problem is avoided by the present apparatus and method which contemplates wrapping the sheet 13 around the plant and connecting the opposite edges of the sheet to form a cylinder.

Another advantage of the plant protector of this invention is the ability to supply the protector in sheet form. The sheets may be supplied in large rolls or as precut sheets placed in packing boxes to allow better use of shipping space. The use of a sheet permits economical manufacture of the plant protector in a wide variety or diameters and heights to satisfy a variety of applications.

In using the plant protector 11, the sheet is formed around a plant and the side edges 19 and 21 are overlapped to define a cylinder. The user next aligns the matching apertures 22 and 23 along the side edges, and places the stake 29 at the overlap 27. Ties 31 are passed through the apertures and around the stake and tightened to seal the edges. The stake can be anchored into the ground before or after the ties have been engaged around the stake. The user may also slip the ties over the stake after the ties have been loosely engaged through the apertures.

The stability of the plant protector may also be increased by inserting a portion of the bottom edge 17 into the earth to reduce lateral twisting and turning caused by wind. The insertion of the bottom edge into the ground for increased stability is especially effective when using a sheet having a corrugated outer layer 35. Insertion of the plant protector into the ground also forms a seal between the bottom edge and the ground which increases the sheltered climate effect by reducing ventilation of the tree protector.

Figure 5:
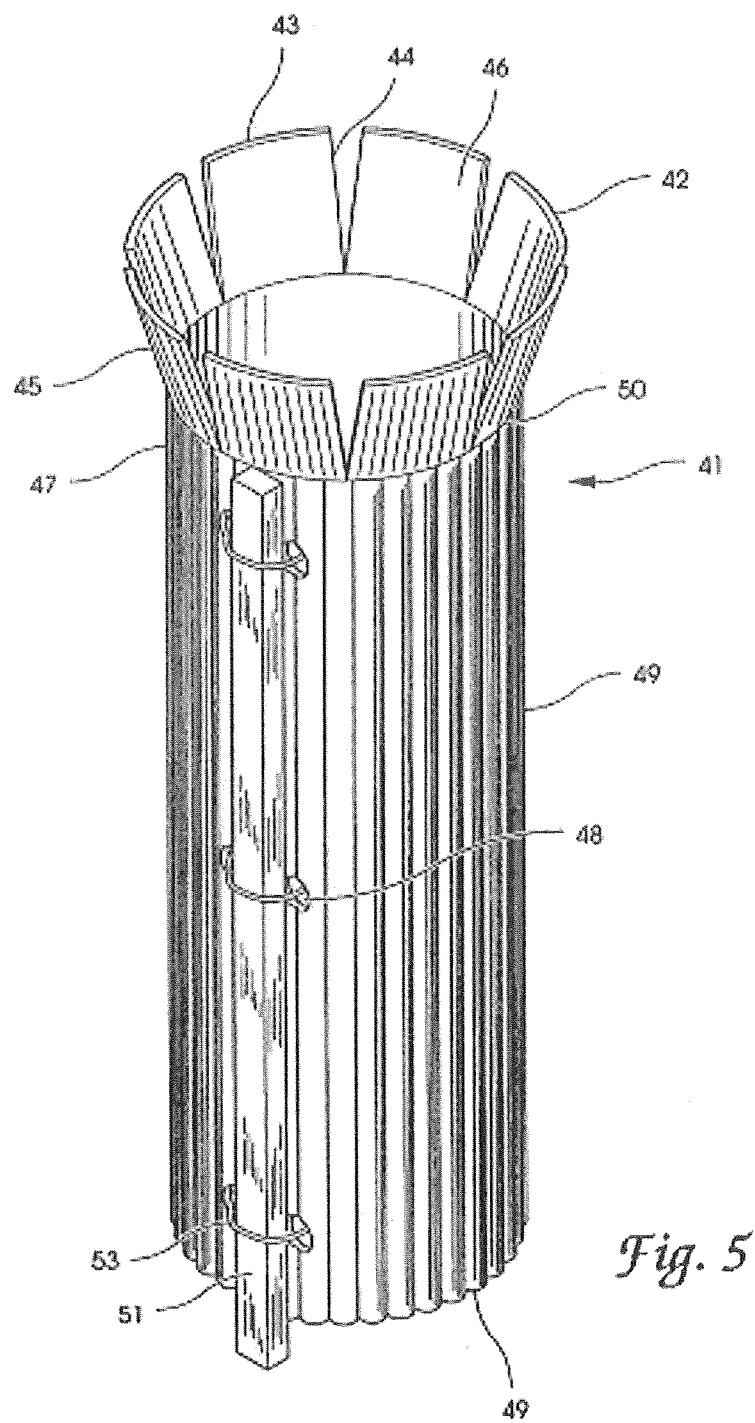
FIG. 5 illustrates an alternative embodiment of the plant protector that includes top flaps which can be bent outward of the top of the plant protector.

Referring now to FIG. 5, an alternative embodiment of the invention is shown in which a plant protector apparatus 41 includes the principal features of plant protector apparatus 11 and additionally includes top flaps 42 formed along top edge 43 of the inner layer 46. The flaps 42 are defined by a plurality of longitudinal slits 44 formed on a portion 45 of the inner layer 46 which extends beyond top edge 50 of the corrugated layer 47 to the top edge 43. Alternatively, the flaps may be cut into the corrugated layer 47 as well in the instance with no portion 45 extending beyond the corrugated layer. The top flaps 42 can be folded outward to accommodate branches near the top edge 43, and to decrease chaffing damage to the branches due to motion of the protector 41 resulting from the wind. It is preferred that the flaps be at least one or two inches long although they may be shorter in alternative embodiments. The top flaps may resiliently engage the tree branches between the flaps, further securing the upper portion of the plant protector.

Alternatively, the portion 45 of the inner layer 46 which extends beyond top edge 50 of the corrugated layer 47 can be folded outwardly over the corrugated layer or extend upward. In this embodiment the portion 45 is continuous between the side edges rather than having flaps 42 defined by longitudinal slits 44 as shown in FIG. 5. The unslit portion 45 in this embodiment has been effective in reducing chaffing damage due to its substantially smooth surface and resilient cushioning effect when in contact with plants. Details of this variation are described herein in connection with FIGS. 9-11.

Figure 6:
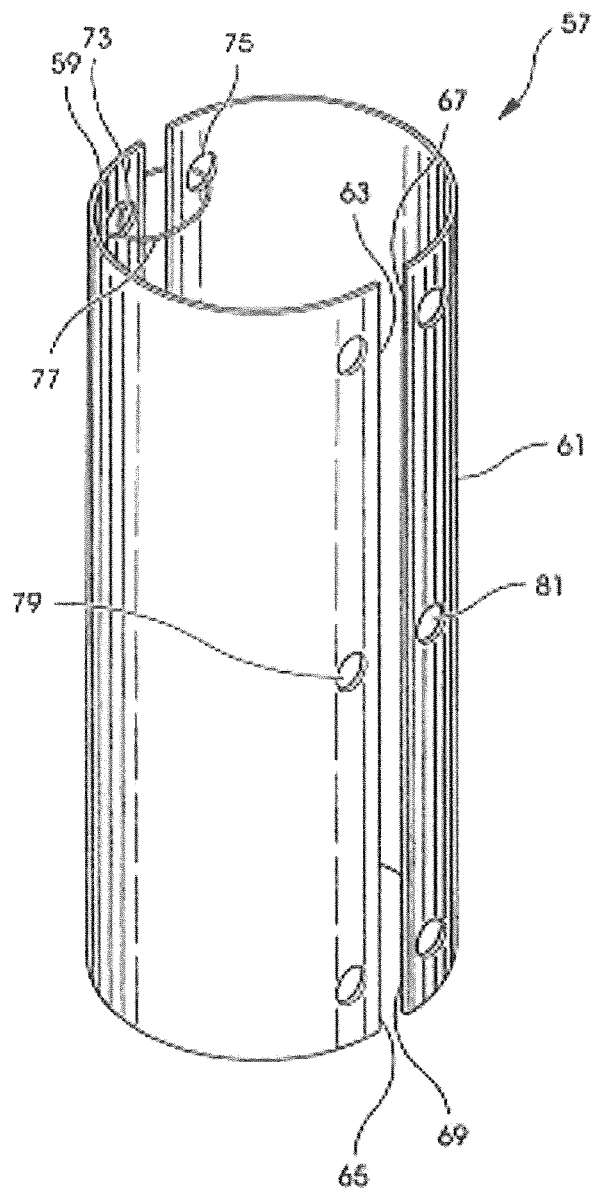
FIG. 6 is a side view showing two sheets connected to provide a larger diameter plant protector with flexible ties engaged through matching side edge apertures prior to tightening. For clarity, the plant protector is shown without the stake and the flexible ties for engaging the matching apertures on the opposite side edges of the sheets.

FIG. 6 illustrates a composite plant protector 57 formed by a first sheet 59 and a second sheet 61, each of which can be the configured like sheet 13 in FIG. 1. The first sheet 59 includes a first side edge 63, and a second side edge 65, while the second sheet also includes a first side edge 67 and a second side edge 69. The respective first side edges 63 and 67 each include a number of matching apertures 73 and 75 offset from the respective side edges. The apertures 73 and 75 can be aligned so that the first side edges of the two sheets 59 and 61 overlap. Flexible ties 77 passing through the apertures 73 and 75 can secure the sheets together at the first edges 63 and 67. The second side edges 65 and 69 of the first sheet 59 and second sheet 61, respectively, also include matching apertures 79 and 81. A number of flexible ties (not shown) can be passed through matching apertures 79 and 81 to encircle a stake (not shown) in a manner described above, thereby forming a larger diameter cylinder. It is apparent that a plurality of sheets, such as sheet 13 in FIG. 1, can be connected in the manner just described to form a composite plant protector, such as protector 57 in FIG. 5. The resulting cylinder is sealed at all overlapping side edges using flexible ties. Stakes, such as stake 29, can be attached at each of the side edge overlaps using the same ties 77.

Figure 7:
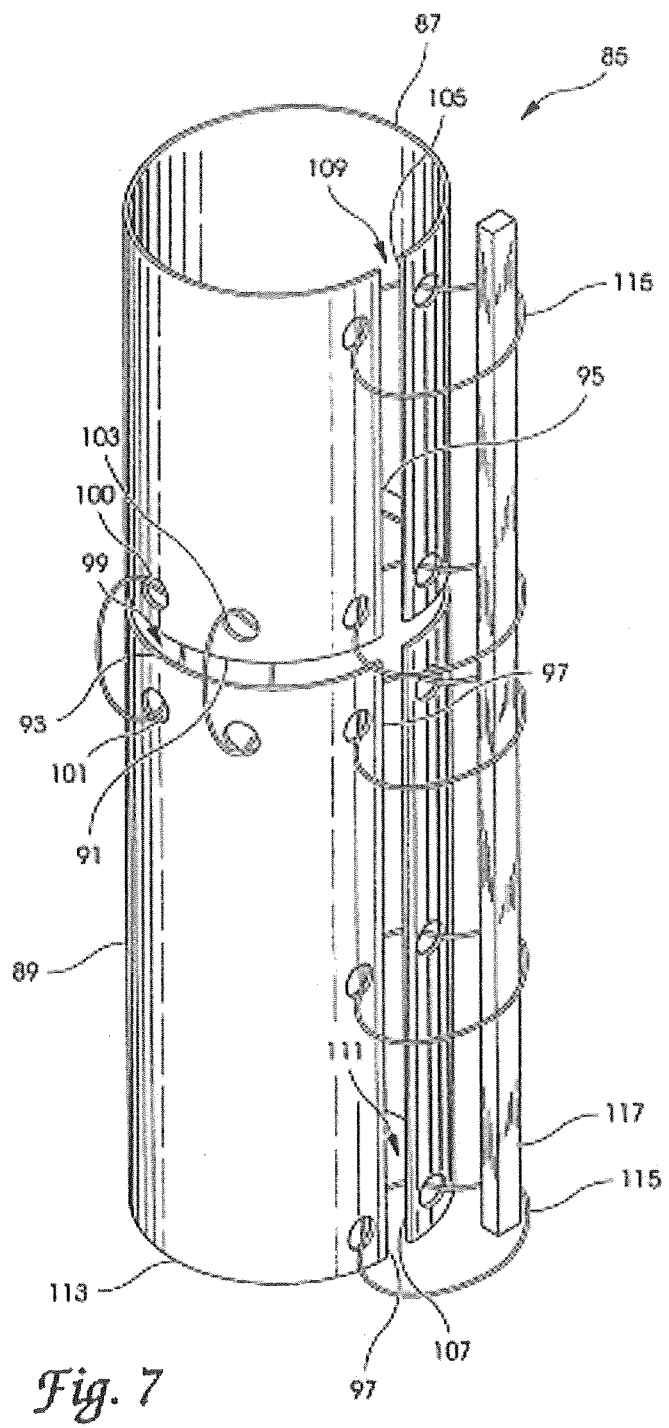
FIG. 7 is a side view of a plant protector apparatus having two sheets which are vertically connected to provide a taller protector apparatus.

FIG. 7 illustrates an alternative embodiment of a composite plant protector for taller plants. In this embodiment, a composite plant protector apparatus 85 includes a first sheet 87 and a second sheet 89, each of which include the features of the sheets shown in FIGS. 1-4. The first sheet 87 includes a bottom edge 91 which is situated adjacent top edge 93 of the second sheet 89. The edges 91 and 93 include a plurality of matching apertures 100 and 101, respectively, which are located a substantially equal distance from their respective edges 91 and 93. Flexible ties 103 passing through apertures 100 and 101 connect the bottom edge 91 of the first sheet 87 to the top edge 93 of the second sheet 87 thereby forming a taller cylinder.

Plant protector 85 also includes side edges 95 on the first sheet 87 and 105 on the first sheet 87 with matching pairs of apertures 109. The second sheet 89 includes side edges 97 and 107, also with matching pairs of apertures 111. A plurality of flexible ties 115 extending through the aperture pairs 109 and 111 can be used to engage the cylindrically formed sheets to a stake 117 in the manner described above. The stake 117 differs from the stakes previously described in that it is longer to support the taller cylinder formed by the composite plant protector 85 of FIG. 6.

It is also contemplated that the first sheet 87 and the second sheet 89 be sealed together without requiring matching apertures 100 and 101 and ties 103 passing there through by using adhesive tape at the respective bottom edge 91 and top edge 93. It is preferred to apply the adhesive tape to the inner portion of the sheets for protection from the elements prior to placement around the plant. Alternatively, the sheets may be joined by adhering the tape to the outer portion of the sheet. It is also contemplated that the sheets 87 and 89 may be joined by a heat seal. The heat seal may be formed prior to shipment to the user or on-site by the user.

Figure 8:
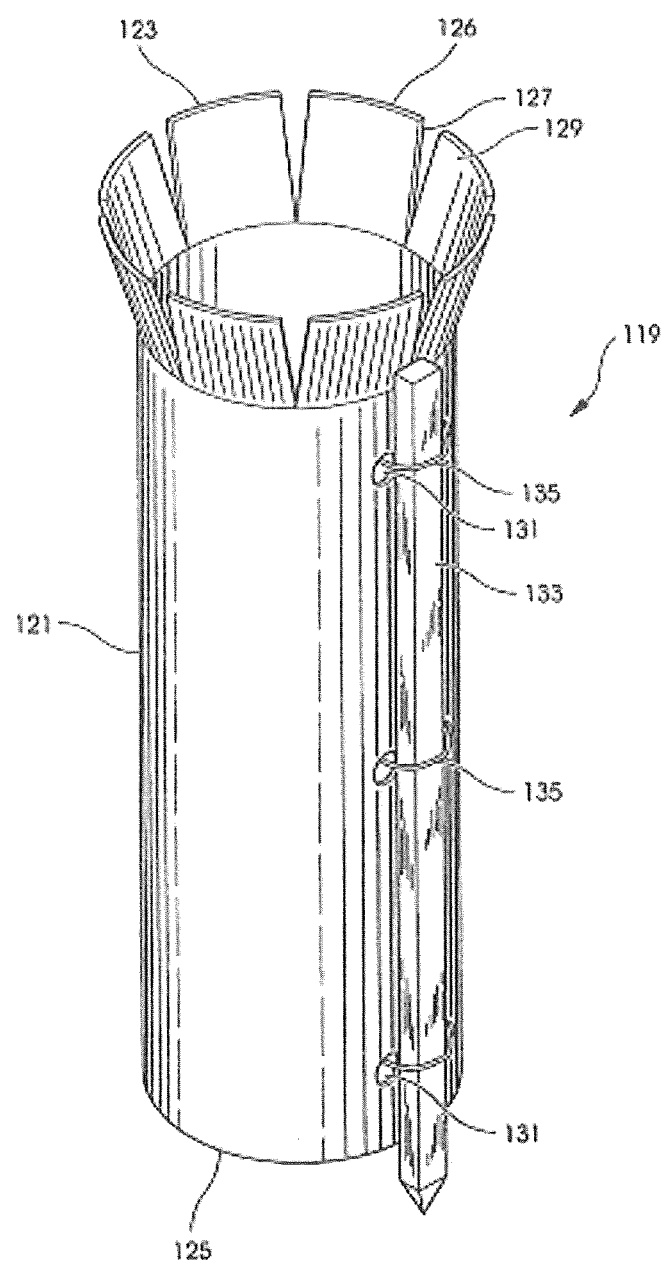
FIG. 8 is a side elevation view of an alternative embodiment of the plant protector apparatus having a tubular body.

Referring to FIG. 8, an alternative plant protector apparatus 119 is shown. The plant protector apparatus 119 comprises a resilient polymeric cylinder 121 having a top end 123 and a bottom end 125. The cylinder 121 includes a substantially continuous wall 126 which defines longitudinal slits 127 which define top flaps 129 located adjacent the top end 123. The cylinder also includes matching pairs of apertures 131 spaced at uniform distances from the bottom end 125. The plant protector apparatus 119 also includes a stake 133 and flexible ties 135 which pass through the matching apertures 131 and around the stake. The cylinder 121 in this embodiment is formed from a single face thermoplastic, cardboard or cellulosic material. It is preferred that a number of cylinders 121 be provided having slightly different diameters to permit nesting for more efficient shipment of the plant protectors. Alternatively a sheet 13 as shown in FIGS. 1-4 may have its side edges 19 and 21 heat sealed to one another to form the resilient polymeric cylinder 121.

The plant protector 119 is placed around the plant to be protected by sliding the cylinder 121 over the plant, sliding the flexible ties 135 through the matching apertures 131 and encircling the stake. 133 The ties 135 are tightened and the plant protector is anchored by anchoring the stake and the bottom end into the ground. After the plant protector is anchored the top flaps are positioned by bending the top flaps outward from the plant.

Figure 9:
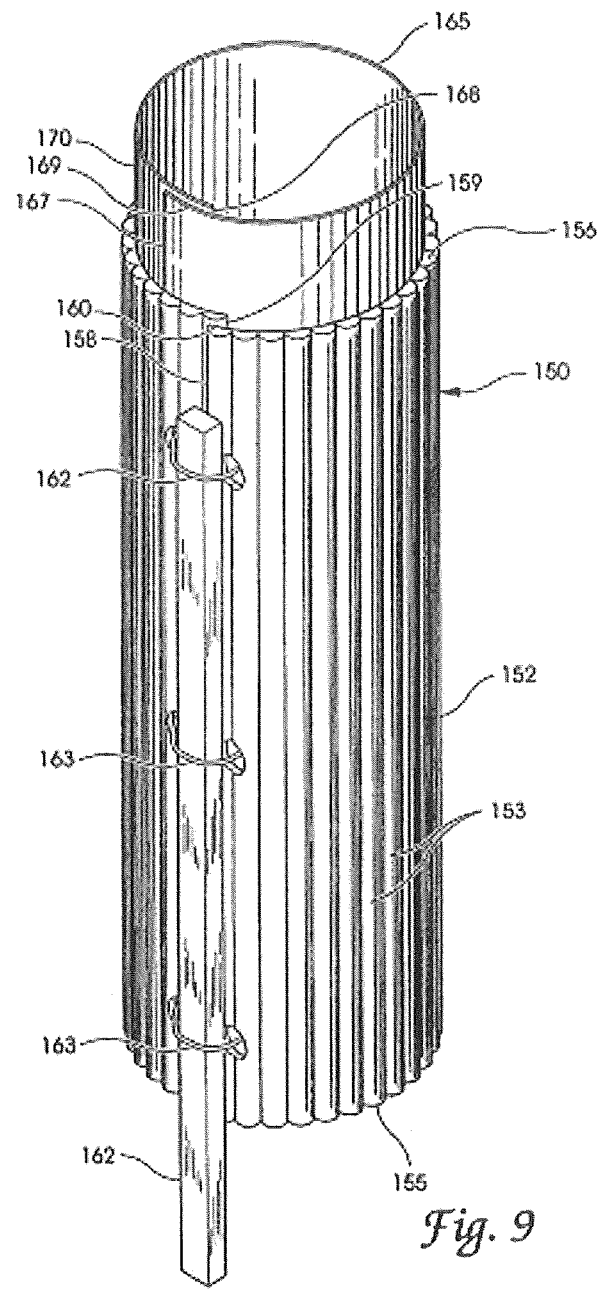
FIG. 9 is a side view of a further embodiment of the plant protector invention.
Figure 12:
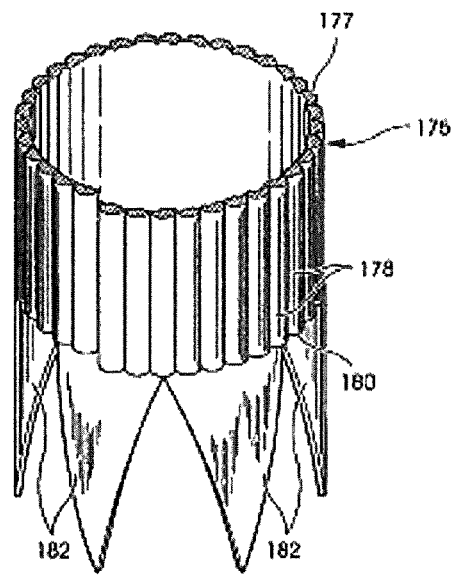
FIG. 12 is a partial side view of still another embodiment of the invention showing a spike formed at the bottom edge of the protector.

Referring now to FIG. 9, an alternative embodiment of the invention is depicted which parallels the embodiment shown in FIG. 5. Specifically, a plant protector apparatus 150 is formed by an outer sheet 152 which is corrugated to include a number of longitudinally extending grooves 153, in a manner previously described. The outer sheet 152 has a bottom edge 155, which will ultimately be disposed adjacent the ground, and an opposite top edge 156. The first side edge 158 and second side edge 159 is overlapped at a portion 160, in a manner previously described. A number of matching apertures are provided in each of the edges 158 and 159, substantially identical to the apertures 22 and 23 shown in FIG. 1. An anchor stake 162 is attached to the outer corrugated sheet 152 by a number of flexible ties 163, each extending through corresponding apertures in the outer sheet, in a manner previously described.

The plant protector 150 further includes an inner sheet 165, which in this instance is preferably separate from the outer sheet 152. The inner sheet includes a first and second side edges, 167 and 168 respectively, which join at an overlap 169. The overlap 169 corresponds to the overlap 160 for the outer sheet 152. The inner sheet also includes corresponding matching apertures which are aligned with the similar apertures in the outer sheet 152.

In this embodiment of the invention, the plant protector 150 includes an extended top portion 170 of the inner sheet 165. In one specific embodiment, the top sheet extends beyond the top edge 156 of the outer sheet 152 by one-half-one and one half inches. The inner sheet 165 is made of a thinner gauge material than the outer corrugated sheet 152 so that it is very flexible and resilient should it contact the plant to be protected. In this embodiment, the top portion 170 differs from the embodiment shown in FIG. 5 in that the top portion is continuous, rather than formed into a number of flaps, such as flaps 42 in that earlier embodiment.

In a modification of the plant protector shown in FIG. 9, a plant protector 150' is depicted in FIG. 10. In this embodiment, the plant protector 150' is formed by an outer sheet 152 which is identical in all respects to the like numbered component in FIG. 9. The difference between the embodiment of FIG. 10 is that the top portion 170' is folded over the top edge 156 of the corrugated outer sheet 152. Specifically, the top portion 170' of the inner sheet 165' is folded at a fold portion 172' to overlap the top edge 156. This fold is shown in more detail in the cross-sectional view of FIG. 11. In this figure it can be seen that the overlapping side edges 167' and 168' of the inner sheet 165' are also folded over the top edge 156 of the outer sheet 152.

In assembling this particular version, the inner sheet 165 is laid over the outer sheet 152, both sheets lying flat. The apertures in the respective sheets are then aligned. Next, the inner sheet 165', and particularly the top portion 170', is folded over the top edge 156 of the outer sheet 152 to form a fold 172'. In this form, both sheets are then wrapped around into a cylindrical shape, such as the shape shown in FIG. 10. The stake 162 is then positioned adjacent the matching apertures and the flexible ties pass around the stake and through the apertures to completely secure the plant protector 150'.

It can be seen that the embodiment of FIGS. 9-11 add to the versatility of the plant protector 150 of this invention. In one instance, the inner sheet 165 can remain with its top portion 170 extending upright from the outer sheet 152. In another use, the top portion 170' is folded over the outer sheet. The top fold 172' of this latter embodiment provides a rounded surface that is gentler to the plant being protected by the apparatus. In addition, the fold 172' adds additional hoop stiffness at the upper edge of the tree protector 150' to prevent buckling of the apparatus. In the preferred embodiment, a separate inner sheet 165 is provided to overlay the outer sheet 152. Alternatively, the inner and outer sheets can be already laminated together, and the top portion 170 of the inner sheet formed by cutting off an upper portion of the corrugated outer sheet to expose the top portion 170 beneath.

In a modification to each of the previously described embodiments, a plant protector 175, having an outer sheet 177 with corrugation grooves 178, can include spikes 182 extending from the bottom edge 180 of the sheet 177. These spikes are preferably 3-5 inches long per foot of out-of-ground length of the plant protector 175. That is, if the plant protector extends five feet out of the ground, the stakes 182 are preferably 15-25 inches long in order to firmly anchor the plant protector 175. In the preferred embodiment, the spikes 182 are cut from a single corrugated sheet. In this matter, the spikes 182 would at least initially include corrugation grooves 178. However, in order to add stiffness and facilitate introduction of the spikes into the ground, these corrugation grooves 178 are flattened at the spikes, thereby yielding thicker material at that portion of the plant protector 175. Alternatively, although less desirable, the outer sheet 177 can be formed so that the portion ultimately cut to form the spikes 182 is not formed with corrugation grooves 178. When using the spikes 182 of this modification, it is preferred that the spikes flare slightly outward away from the cylindrical plant protector 175 in order to provide a firm anchor for the plant protector into the ground.

Figure 13:
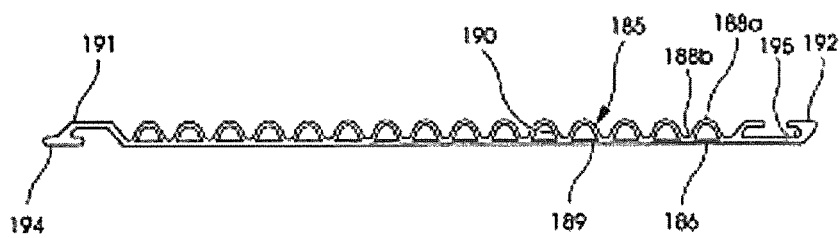
FIG. 13 is a top elevational view of a fully extruded plant protector according to one embodiment of the invention, shown prior to forming into a cylinder.
Figure 14:
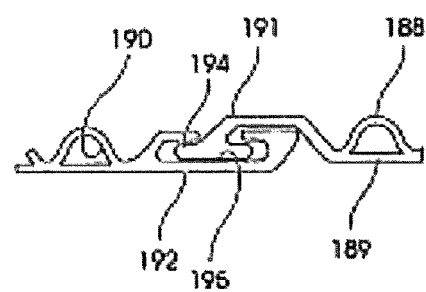
FIG. 14 is an enlarged view of the interlocking fastener of the plant protector shown in FIG. 13.

Yet another embodiment of the protection and growth device is shown in FIGS. 13 and 14. In this embodiment, the plant protector 185 is defined by a single extruded sheet 186. Specifically, the extruded sheet 186 is formed with corrugation ridges 188A and grooves 188B integral with an inner sheet 189. The corrugation ridges form a channel 190 between the ridges 188A and the inner sheet 189. Alternatively, the ridges 188A can be solid, that is no channel 190 defined between the corrugations and the inner sheet. However, it is preferred that the extruded sheet 186 include the channels 190 in the corrugations to reduce the weight without sacrificing any strength for the plant protector apparatus 185.

The extruded sheet 186 is also formed with a first fastener end 191 and an opposite second fastener end 192, both fasteners operating as a male-female interlocking fastener. The first fastener end defines a flanged tab 194 which fits within a correspondingly shaped recess 195 at the second fastener end 192. As shown in FIG. 14, when the extruded sheet 186 is wrapped into a cylinder, the flange tab 194 is received within the recess 195 to engage the respective ends of the sheet 186. It is understood that the plant protector 185 in accordance with this embodiment is extruded in a single longitudinal sheet so that the flanged tab 194 and recess 195 extend along the entire length of a side edge of the extruded sheet 186. With this embodiment, the flexible ties of the previous embodiments are not required to connect the opposite side edges of the extruded sheet 186. However, apertures may be provided to receive ties to engage a stake to the plant protector 195.

FIG. 15 illustrates the main support structure of this device known as the skeleton 200, robust flexible sheet, or robust shell. The skeleton 200 is a continuous tube or sheet and is the main support for the plant protector and is configured to circumscribe a living plant. The skeleton 200 has a plurality of ventilation holes 201a,b,c, and d drilled, cut, or punched through its walls. Ventilation is required for increased growth, acclimation of the protected plant to the environmental elements, and better survival rates for the plant. It also reduces the material to needed to manufacture the device, reducing material cost, weight for shipping costs and handling. Also illustrated are several ventilation hole 201 designs—round 201a, square 201b, diamond 201c, and hexagon 201d. In the illustrated examples, the round holes have smaller areas than the square holes. The ventilation hole 201 shape is not limited to these shapes to accomplish the goal. The ventilation hole 201 shape is chosen for manufacturing, structural, or performance issues. For example—the diamond and hexagon shapes 201c,d shapes allow for the ventilation holes 201 to be positioned closer together by staggering the rows while maintaining or even increasing the structural strength of the skeleton 200. The skeleton 200 can be manufactured from materials such as paper, cardboard, plastic, wood, metal, or other materials as needed for the application.

FIG. 15 illustrates the relationship between the components. Fastening ties 202 are used to hold the device to a support stake 203, or vertical support anchoring the device in place over the plant. The plant protector can be placed on or slightly beneath ground level 204. This can add support and keep small rodents from entering the protector. The light transmission of the skeleton 200 can range from opaque to transparent. The amount of light is dependent on the application. Some plants require more light. The age/size of the plant at the time of the devices installation can play a part in the level of transparency of the device. For example, a plant that is taller than the device would need little to no light transmission and a plant shorter than the device would require as much light transmission as possible.

FIG. 16 illustrates a skin 205, or degradable covering to cover the ventilation holes 201 to control, restrict, reduce or eliminate the free flow or exchange of air, climatic conditions and other element/weather. This feature also allows the control, amount or time moisture is maintained or retained in the device for the benefit of the plant.

This skin 205 can be formed at the time of manufacturing as part of that process or as a separate part attached by glue, welding, mechanical device or other method appropriate to the material the device is manufactured from. The skin 205 can be manufactured from degradable material such as paper, cardboard, plastic, wood, metal, or other materials as needed for the application.

FIG. 17 shows a section of the skin 205 removed to illustrate that the ventilation holes 201 exist under the skin 205. The light transmission of the skin 205 can range from opaque to transparent. The amount of light is dependent on the application. Some plants require more light. The age/size of the plant at the time of the devices installation can play a part in the level of transparency of the device. For example a plant that is taller than the device would need little to no light transmission and a plant shorter than the device would require as much light transmission as possible.

FIG. 18 illustrates a technique to control the ventilation while covering the ventilation holes 201. In this embodiment the holes are round with diameters of at least half an inch. One reason for this ability is to keep the plant and its branches from growing vertically out the ventilation holes 201 while allowing ventilation. By using horizontal attachment points 206, instead of laminating the entire skin 205 as shown in FIGS. 16 and 17, the free flow or exchange of air can be controlled while maintaining a solid plant protector. As shown in FIG. 18, a plurality of holes in the skeleton are located between horizontal seems and even while connected the skin is detached from the skeleton except for at horizontal attachment points. FIG. 18 shows horizontal attachment points 206. This allows air flow 208 to travel between the skin 205 and the skeleton 200, then through the ventilation holes 201 into the device. The air flow 208 is created by the chimney effect of wind blowing across the open top of the device.

FIG. 19 illustrates vertical attachment points 206b that create air flow 208 from the bottom of the device. Also shown is the ability to control the level or height in which the air enters the skeleton 200 by adjusting the vertical positions of a thick horizontal attachment point 206a and a thin horizontal attachment point 206c. In the device illustrated in FIG. 19, the vertical attachment points 206b are seems in the skin 205 having thicknesses between 1 and 2 millimeters. The thin horizontal attachment point 206c is a seem in the skin 205 having a thickness of between 3 and 4 millimeters, and the thick horizontal attachment point 206a is a seem in the skin 205 having a thickness between 4 and 5 millimeters. Based on the thicknesses of the seams, the skin 205 will sequentially detach from the skeleton at the vertical attachment points 206b, then the thin horizontal attachment point 206c, then the thick horizontal attachment point 206a. The thin horizontal attachment is a seem extending parallel to the thick horizontal attachment point. Perpendicular seems may also be used.

Figure 20:
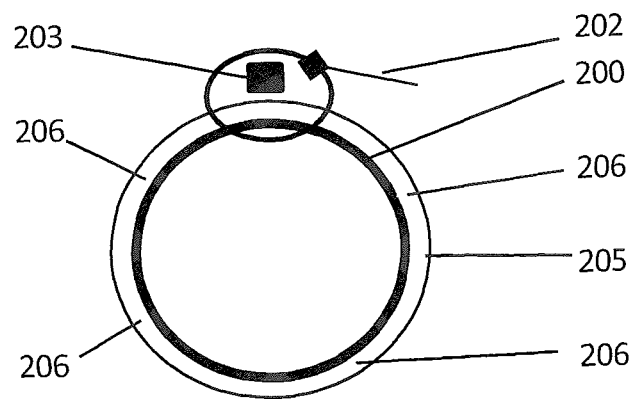
FIG. 20 is a top view of the apparatus showing the relationship of the components as in FIG. 15. It shows the skin and skeleton as continuous walled tubes.

FIG. 20 shows a top view illustrating the relation of the components when the skeleton 200 is a solid continuous tube and the skin 205 is attached using attachment points 206 by lamination, vertical or horizontal attachment points 206 or any other manner. Numerous with varied skeletal sizes may be produced so that that they may be nested within each for easy transportation.

Figure 21:
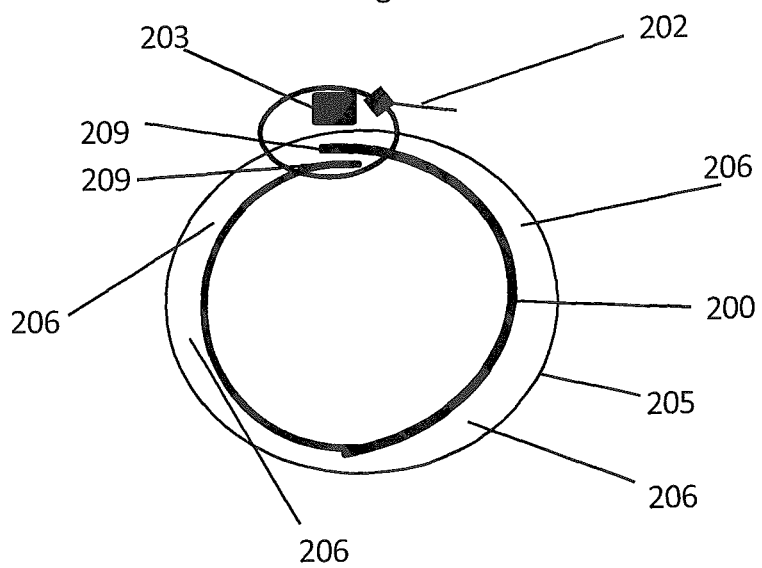
FIG. 21 is a top view of the apparatus showing the relationship of the components as in FIG. 15. It shows how the components of the device work when the skin is a continuous walled tubes and the skeleton is made from a flat sheet that forms a tube when the side walls come together and overlap.

FIG. 21 illustrates the same relationship as FIG. 20 with a different skeleton 200 style. This skeleton 200 style is a flat sheet. It shows the overlap 209 of the right and left sides. This overlap 209 will seal once the ties 202 are tightened against the support stake 203. In an alternate embodiment, the degradable skin is located within the skeleton such that the skeleton circumscribes the degradable covering. Having the degradable covering within the skeleton helps to prevent drift of the degradable material after it detaches from the skeleton.

Figure 22:
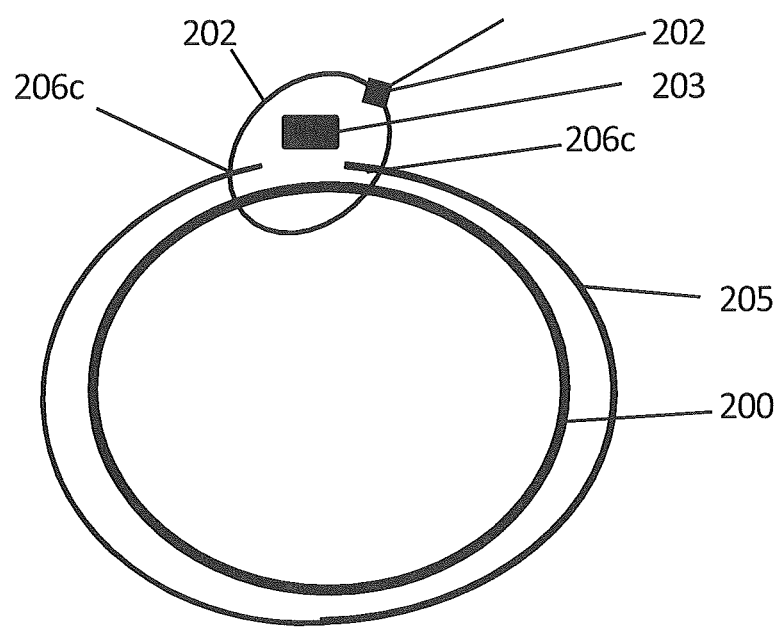
FIG. 22 is a top view of the apparatus showing the relationship of the components as in FIG. 15. It shows how the components of the device work when the skin is made from a flat sheet that forms a tube to cover the ventilation hole. It shows the skin being held in place by the ties that hold the device to the support stake.

FIG. 22 illustrates a skeleton 200 as in FIG. 20 with a skin 205 manufactured as a separate sheet not attached to the skeleton 200 but held in place by the ties 202 with the support stake 203. An advantage to this design is flexibility in the manufacturing process, flexibility to use different material together to make the device, to create flexibility to control the degradation of the skin 205 to increase ventilation. The attachment method will offer 100% ventilation once the skin 205 is released from the ties 202 due the degradation of the skin 205 at the ties 202.

Figure 23:
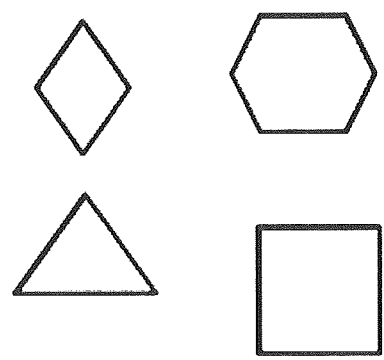
FIG. 23 illustrates several alternatives to the round ventilation holes.

FIG. 22 also shows the possibility to manufacture the device as an oval shape. This device can be made as any shape as examples are shown in FIG. 23.

The finished device possibilities are unlimited when considering all the possible shapes, skins 205 and skeletons 200 as continuous tubes or sheets, different materials, and ventilation hole 201 shapes/position/patterns.

Figure 24:
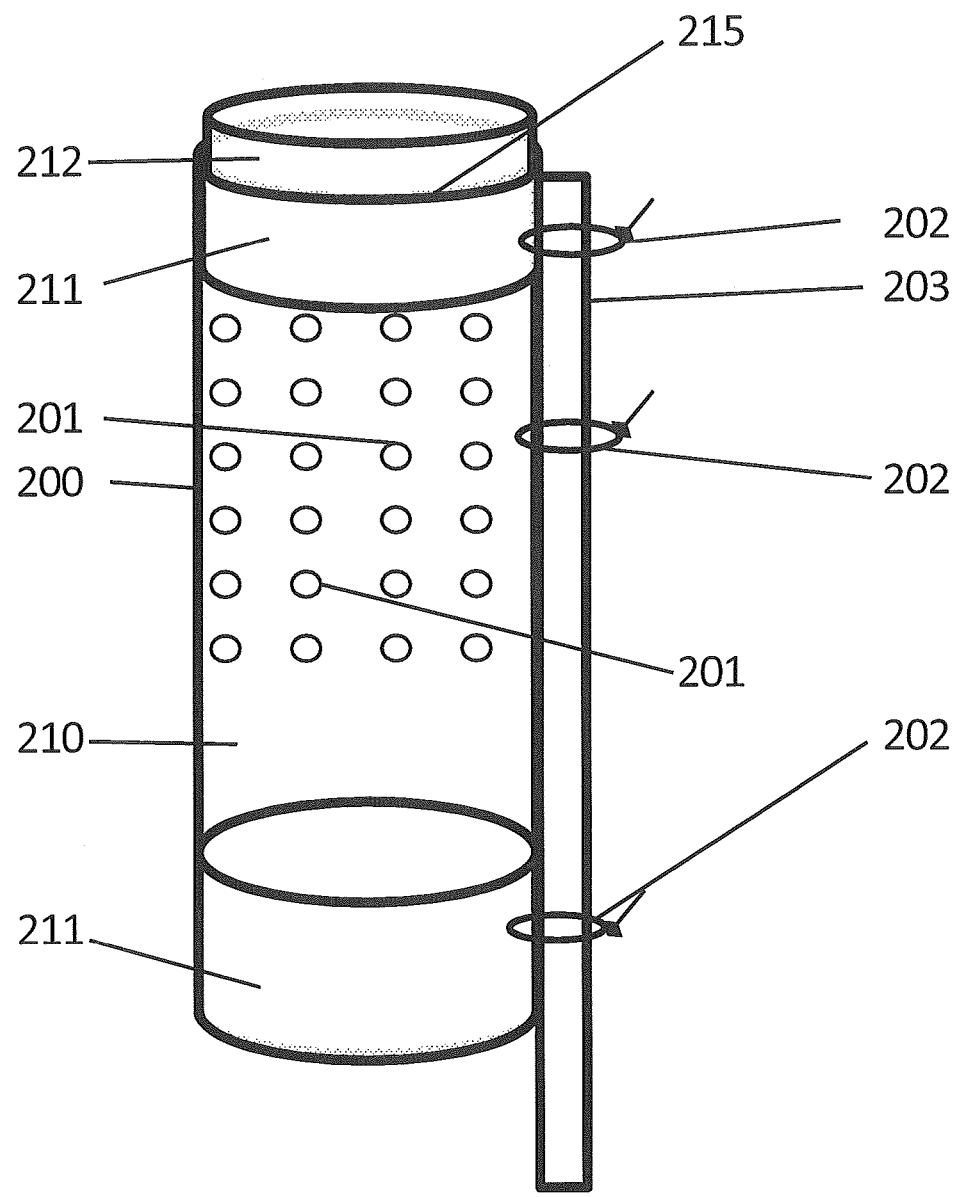
FIG. 24 is a side view of a skeleton design. The center portion of the device is thinner than the top and bottom section.

FIG. 24 illustrates an alternative skeleton 200 design. A material cost savings can be accomplished by reducing the material thickness in the center section 210 of the skeleton 200. Depending on the application the top and/bottom 211 of the skeleton 200 is thicker than the center section 210. The top and/bottom 211 material can also be different than the center section 210. These changes allow for reduced manufacturing costs and control of the plant protectors degradation. Thinning the center section 210 can allow it to degrade, falling away and/or opening up before the top and/bottom 211. Conversely by thickening or using a different material for the top and bottom 211 the degradation time can increase or decrease. UV stabilizers can also be used to create the same outcome. For example the skeleton may be doped with UV stabilizers throughout the entire protector except at areas that are to degrade quickly and open as ventilation holes. The top/bottom 211 allow for better support for the ties 202 to hold the plant protector to the support stake 203.

FIG. 24 illustrates the flexibility to place the ventilation holes 201 as needed for the different applications. This example places the ventilation holes 201 just below the half way point. This allows for applications requiring herbicides. The herbicide can be sprayed below the ventilated area. It is also possible to use any combination and placement of ventilation holes 201 covered or not by a skin 205 to accommodate all species of plants and their applications.

FIG. 24 shows the protective collar 212. This extension from the top of the plant protector protects the plant from rubbing on the protector's top edge 215. The protective collar 212 can be a separate piece attached to the skeleton 200 or the skin 205 can be extended beyond the protectors' top edge 215. Depending on the application the protective collar 212 can be on the inside or outside of the plant protector. Alternatively, the degradable skin may extend beyond the skeleton to act as a protective collar. The protective collar 212 may be a thin flexible material that can be folded over onto itself as a collar on a shirt. The protective collar 212 may be as a flare.

Figure 25:
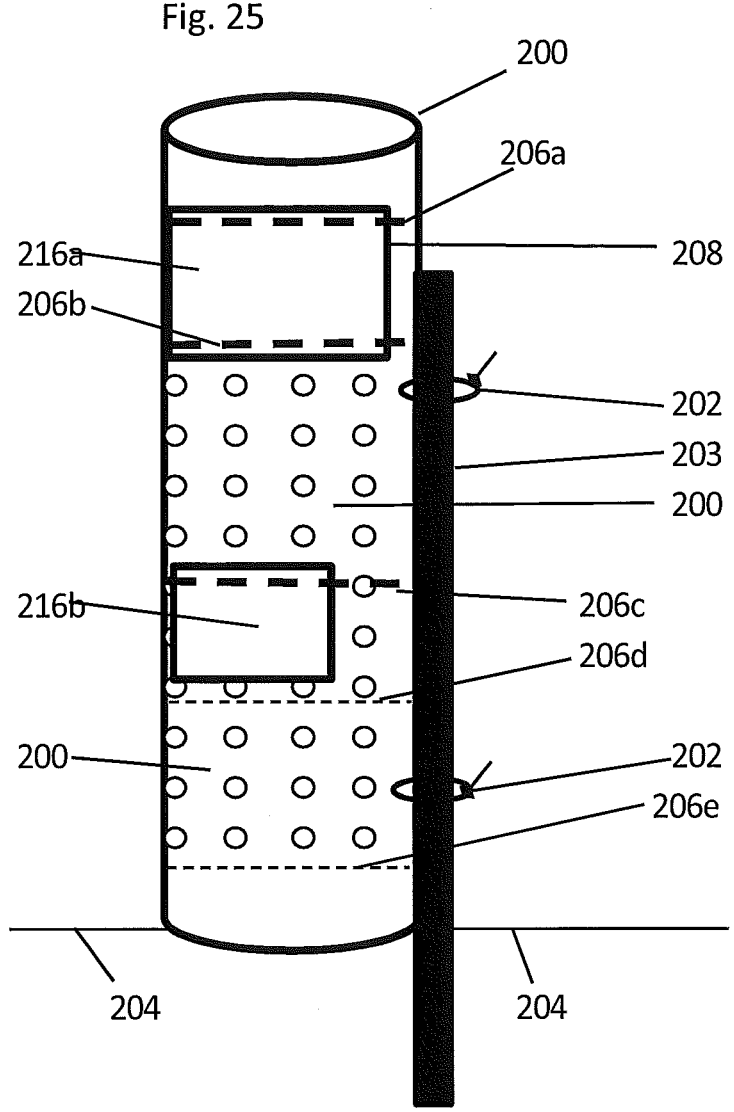
FIG. 25 is a side view of the apparatus in FIG. 16. It illustrates the process of the skin degrading and falling away from the skeleton.

FIG. 25 illustrates the process of the skin 205 self removal feature of this device due to the degradation and break down of the skin 205 and attaching points 206. UV stabilization, material type, material thickness, and many other items and conditions play a part in the degradation of the skin 205. Based on these factors it is possible to control the removal of small, medium, and large pieces of the skin 205 within a given time factor. Even the whole skin 205 can be removed. The degradation is due to many environmental conditions such as the sun (photo degradation), wind, rain, cold, biodegradation and other factors. Humans and animals can also play a part.

FIG. 25 shows the self removal process occurring in larger sections based on horizontal attachment points 206. This illustration shows a complete skin section 216a between attachment points 206b and 206c removed after a time period and the skin section 216b partially removed.

Figure 26:
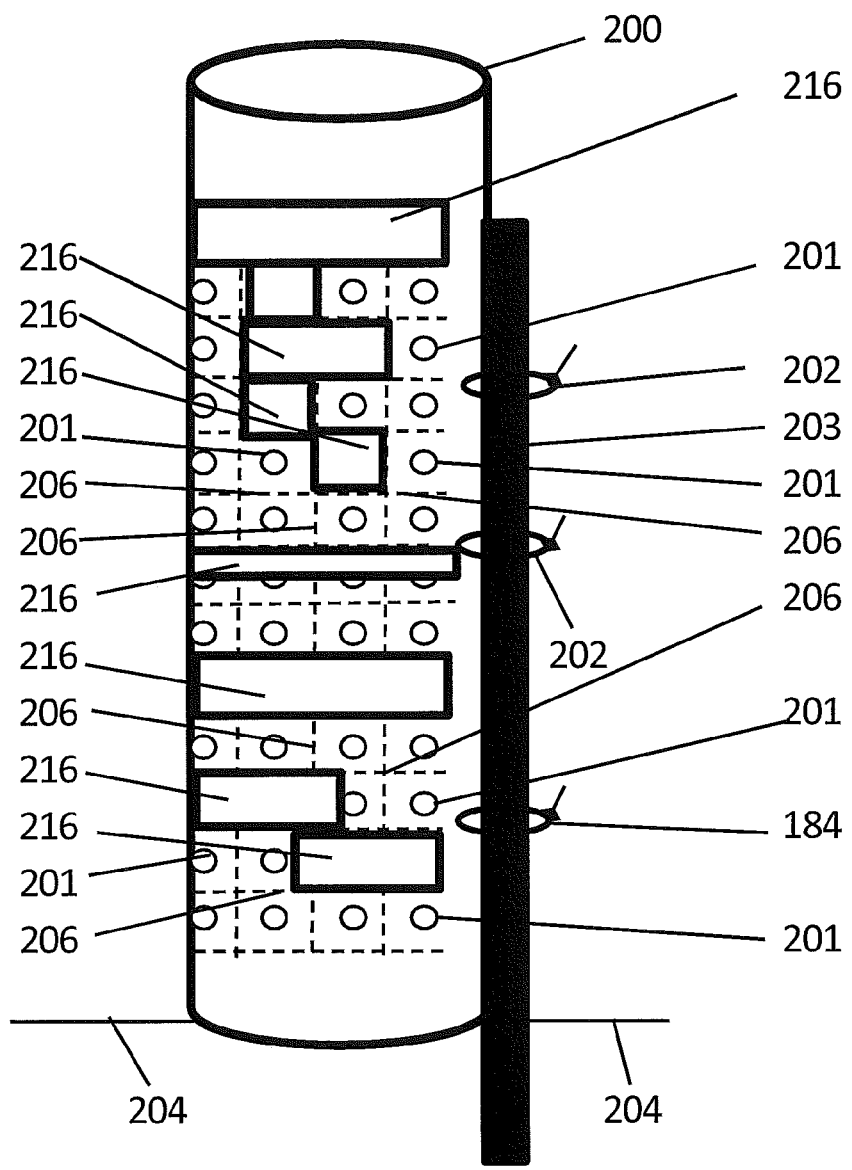
FIG. 26 is a side view of the apparatus in FIG. 16. It illustrates the control over the process of the skin degrading and falling away from the skeleton.
Figure 27:
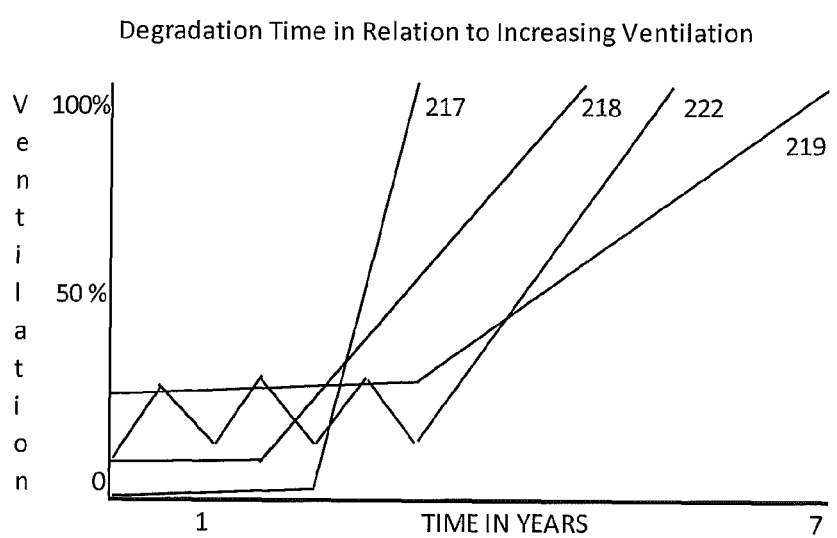
FIG. 27 illustrates four scenarios of the relationship between the increase of ventilation and the degradation of the skin.

FIG. 26 illustrates the self removal of the skin 205 by showing parts of the skin section 216 intact or partially attached to the skeleton 200. The area where the skin 205 has detached and/or fallen from the skeleton 200 has exposed the ventilation holes 201. FIG. 27 illustrates four scenarios of the relationship between the increase of ventilation and the degradation of the skin 201. Line 217 shows a device that starts with no ventilation and within three years 100% of the ventilation holes are open. Line 218 shows a device that starts with light consistent ventilation for the first 18 months and reaches 100% ventilation at 4.6 years. Line 219 shows a device that starts with heavy ventilation for the first 36 months and reaches 100% ventilation at 7 years. Line 222 shows the possible ventilation system that opens and closes as needed over the year taking advantage of the seasons to protect the plant or increase growth. A tightly woven mesh of thermally expanding fibers could be able to provide the ventilation shown in line 222. The temperature decreases, the mesh contracts thereby decreasing the spacing between mesh fibers and decreases the airflow through the mesh. FIG. 26 illustrates an example of a plant protector apparatus that had low ventilation when all of the cover was attached, but after a period of time has high ventilation due to the loss of cover material. As shown in FIG. 16 the cover limits the air flow through the plurality of wholes, while in FIG. 28 there are a plurality of holes through which air may flow uninhibited.

Figure 28:
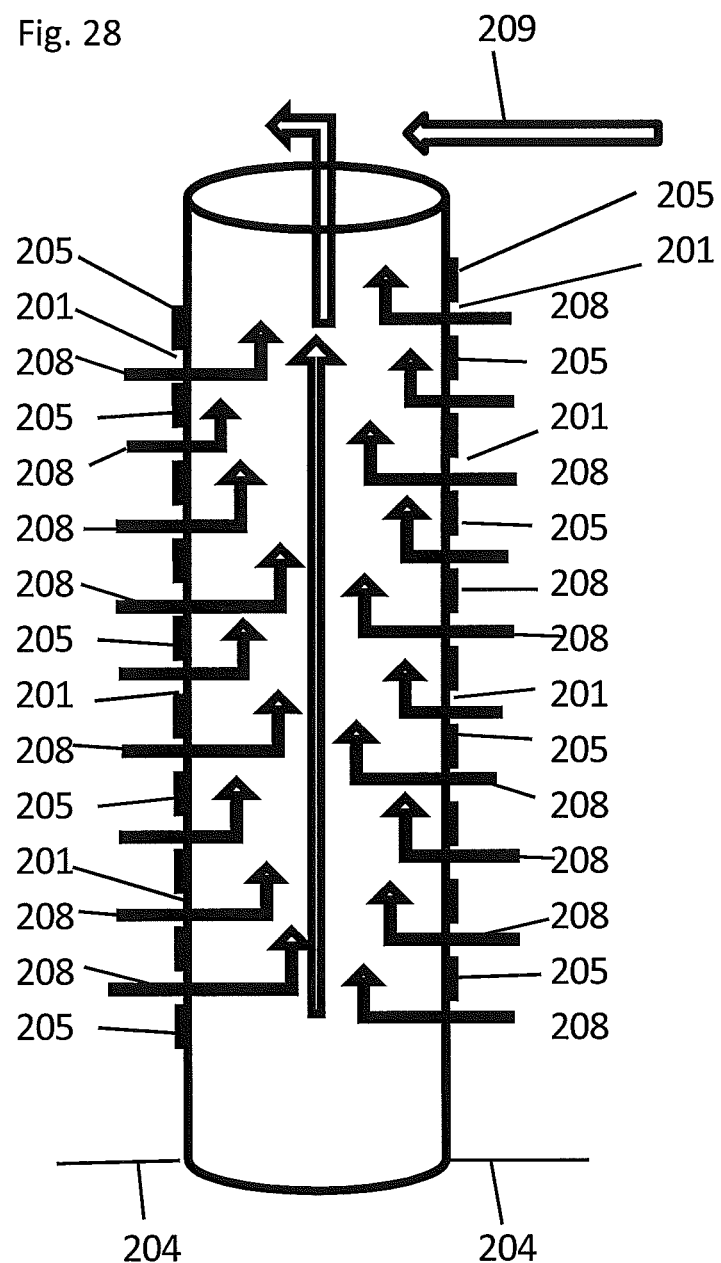
FIG. 28 shows a side view that illustrates air movement through ventilation holes due to a chimney effect that occurs as the wind travels across the open top or the device.

FIG. 28 illustrates the air flow that will occur once the skin 205 covering the ventilation holes 201 degrades. Air flow 208 shows the air entering the device and passing over air flow 209 creates a chimney effect as it passes over the devices open top.

Figure 29:
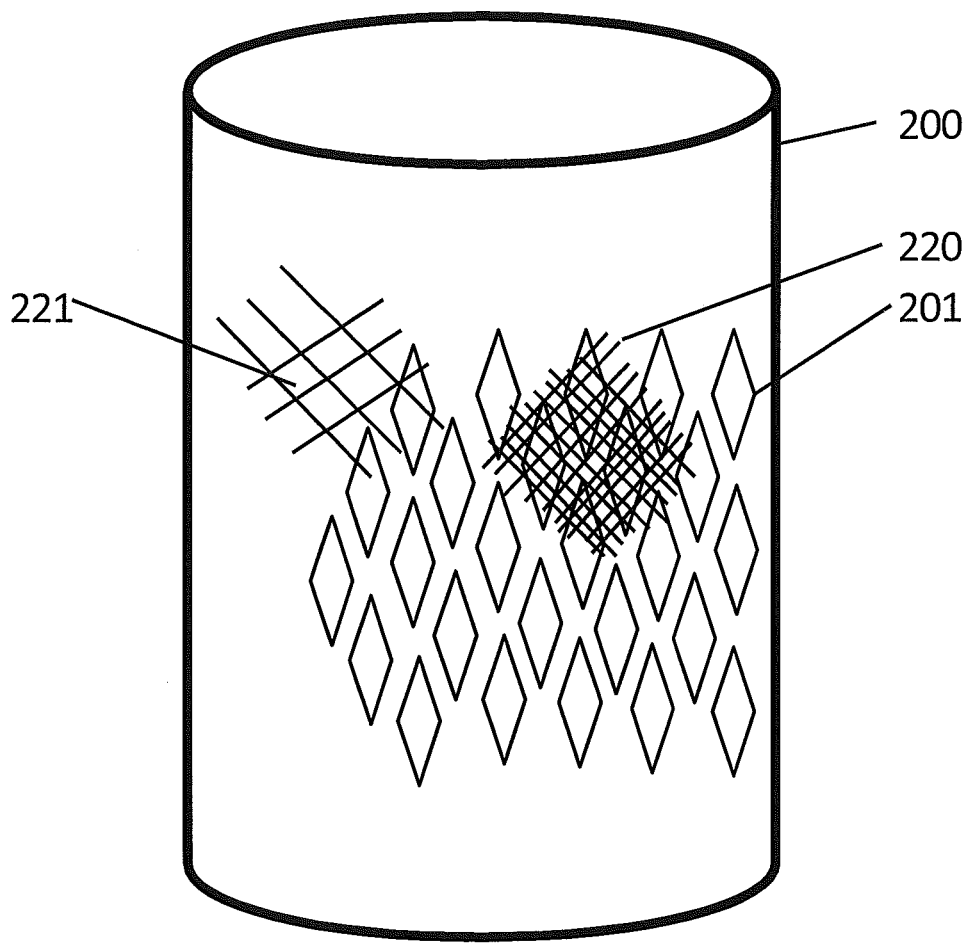
FIG. 29 shows a side view of the device with a net/mesh skin.
Figure 30:
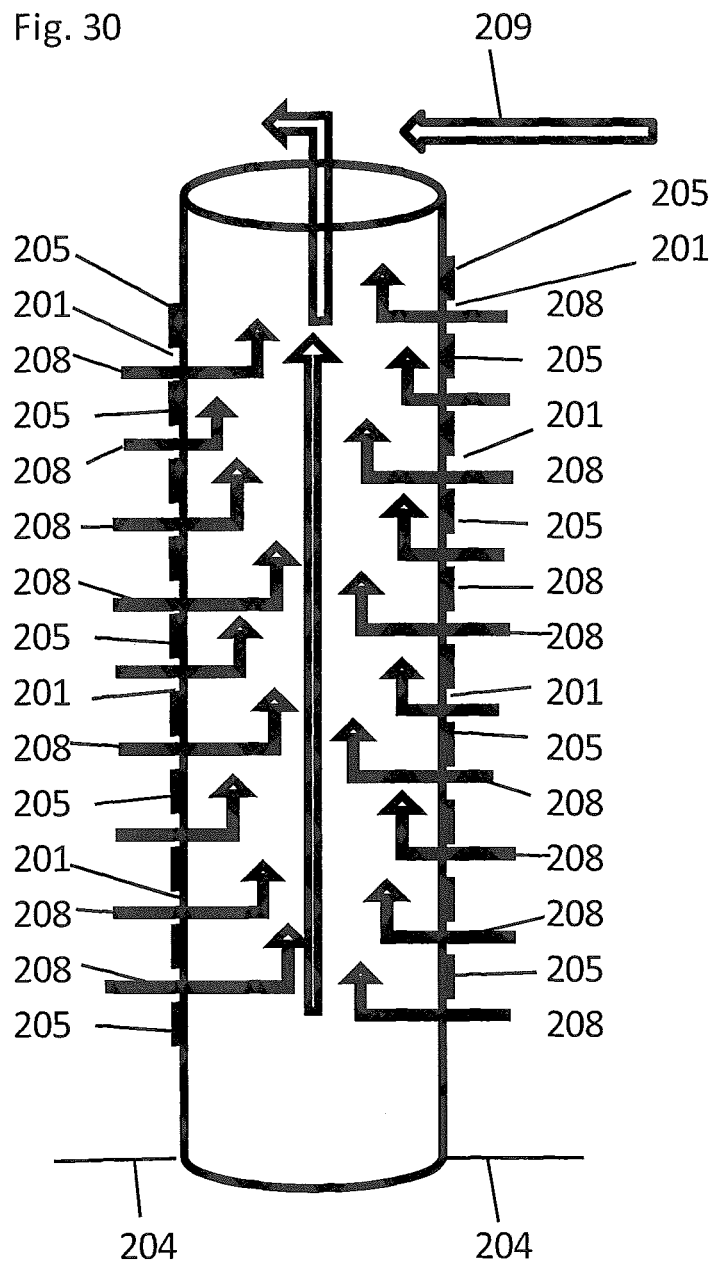
Figure 31:
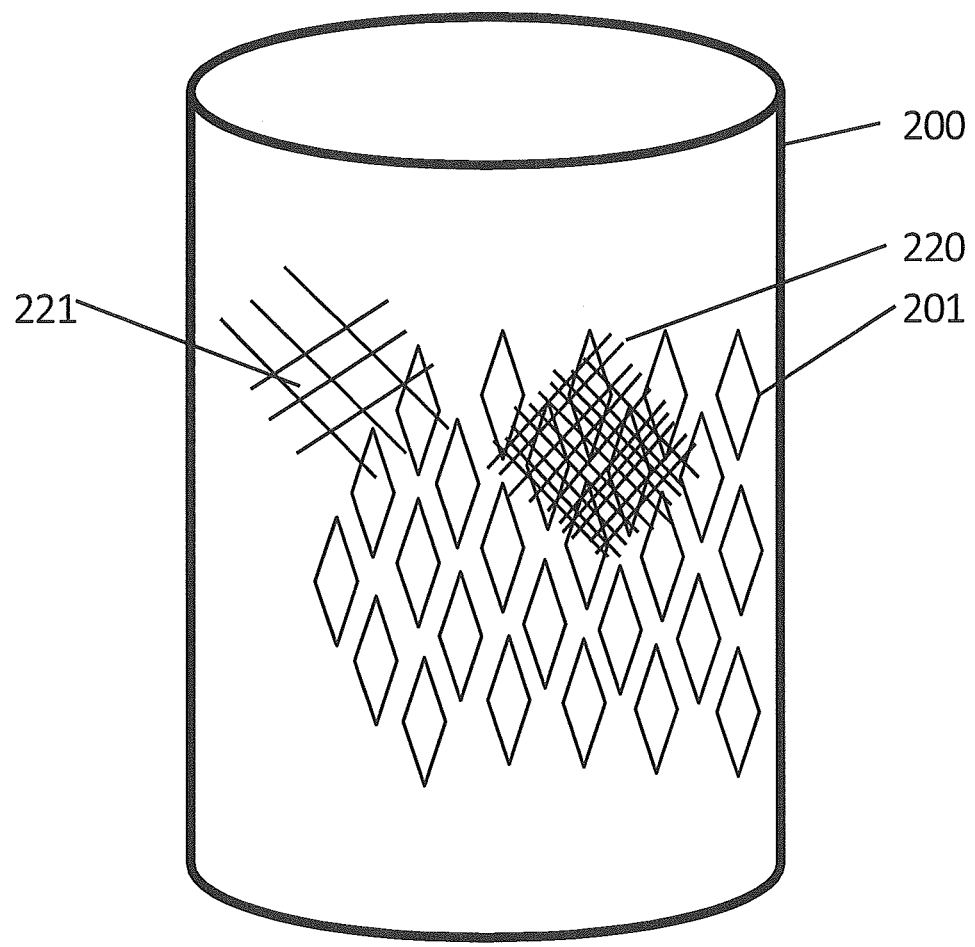

FIG. 29 illustrates the skin 205 could be a net or mesh material 220 which the holes of the net/mesh material 220 are smaller than the ventilation holes 201. This allows for permanent ventilation. The ventilation can be controlled based on the mesh or net hole size 221.

While various embodiments of the invention have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A variable ventilation plant protector apparatus comprising:
   a vertical support;
   a robust flexible sheet for circumscribing a living plant, the flexible sheet having a plurality of holes including a first row of holes and a second row of holes, the robust flexible sheet connecting to the vertical support; and
   a degradable covering for restricting an air flow through the plurality of holes, the degradable covering directly secured to the robust flexible sheet at both a first seam and a second seam;
   both the first seam and the second seam structured to degrade to remove portions of the degradable covering from restricting the air flow through portions of the plurality of holes; and
   the first seam extending parallel to the first row of holes, and the holes in the first row of holes located equidistant from the first seam; and
   the degradable covering having a first thickness at the first seam and a second thickness at the second seam, wherein
   the first thickness is greater than the second thickness,
   the second seam is structured to detach from the robust flexible sheet before the first seam detaches from the flexible sheet, and
   detachment of the second seam from the robust flexible sheet removes the degradable covering from adjacent to the first row of holes.

2. The plant protector apparatus of claim 1 wherein the first seam is parallel to both the second seam and the second row of holes.

3. The plant protector apparatus of claim 1 further comprising:
   wherein the first seam is perpendicular to the second seam,
   the second seam extending parallel to the second row of holes, and the holes in the second row of holes located equidistant from the second seam,
   wherein a hole in the plurality of holes is located in both the first row of holes and the second row of holes.

4. The plant protector apparatus of claim 1 further comprising
   the second seam extending parallel to the second row of holes, and the holes in the second row of holes located equidistant from the second seam,
   wherein all of the degradable covering between the first seam and the second seam is detached from the flexible sheet, and both the first row of holes and the second row of holes are located between the first seam and the second seam.

5. The plant protector apparatus of claim 1 wherein
   the degradable covering is constructed of a material selected from a group consisting of polypropylene, polystyrene, polyethylene, and polycarbonate; and
   the flexible sheet is constructed of a substance selected from a second group consisting of cardboard and chip board.

6. The plant protector apparatus of claim 1 wherein the flexible sheet has a top edge, a bottom edge, a first side edge, and a second side edges, and a plurality of matching pairs of apertures offset from said two side edges,
   each matching pair of apertures having
   a first aperture adjacent to the first side edge,
   a second aperture adjacent to the second side edge, and
   the first aperture and the second aperture located the same distance from the top edge.

7. The plant protector apparatus of claim 1 wherein the degradable covering is secured to the flexible sheet with a material selected from a group consisting of glue, and tape.

8. The plant protector apparatus of claim 1 wherein the degradable covering circumscribes the flexible sheet.

9. The variable ventilation plant protector apparatus of claim 1 wherein
   the plurality of holes consists of a plurality of vertical rows of holes, and
   between each vertical row of holes the degradable covering is directly secured to the robust flexible with a vertical seam.

10. The variable ventilation plant protector apparatus of claim 1 wherein
    the plurality of holes consists of a plurality of horizontal rows of holes, and
    between each horizontal row of holes the degradable covering is directly secured to the robust flexible with a horizontal seam.

11. The variable ventilation plant protector apparatus of claim 1 further comprising:
    the degradable covering having a first portion for restricting the air flow through the first row of holes, the first portion directly secured to the robust flexible sheet at the first seam, a second portion for restricting the air flow through the second row of holes, the second portion secured to the robust flexible sheet at the second seam, the first portion connecting to the second portion only through the robust flexible sheet;

both the first seam and the second seam structured to degrade to remove portions of the degradable covering from restricting the air flow through portions of the plurality of holes.

12. The plant protector apparatus of claim 1 wherein the degradable covering is welded to the flexible sheet.

13. A set of variable ventilation plant protector apparatuses, each member of the set being as claimed in claim 1 and each having a different cross-sectional configuration chosen to allow the members to be nested in transportation or storage.

14. A plant protector apparatus structured to have low ventilation at a first time, a moderate ventilation at a second time, and high ventilation at a third time, the second time following the first time and the third time following the second time, the plant protector apparatus comprising:

an elongate robust shell open at a top end and a bottom end, the shell including a first set of holes and a second set of holes spaced between the top end and the bottom end; and a degradable covering for obstructing an air flow through both the first set of holes and the second set of holes at the first time, the degradable covering directly secured to the robust shell at both a first attachment area and to a second attachment area at the first time, the degradable covering having a first concentration of ultraviolet stabilizers at the first attachment area structured to be secured robust shell at the first time and detached from the robust shell at both the second time and the third time, wherein detachment of the degradable covering from the first attachment area unblocks the airflow through the first set of holes;

the degradable covering having a second concentration of ultraviolet stabilizers at the second attachment area structured to be secured robust shell at both the first time and the second time, and detached from the robust shell at the third time, wherein detachment of the degradable covering from the second attachment area unblocks the airflow through the second set of holes;

wherein the second concentration is substantially greater than the first concentration; and wherein obstructing both the first set of holes and the second set of holes with the degradable covering provides the low ventilation within the plant protector apparatus, obstructing the second set of holes with the degradable covering while the first set of holes is unblocked by the degradable covering provides the moderate ventilation within the plant protector apparatus, and having both the first set of holes and the second set of holes unblocked by the degradable covering provides the high ventilation within the plant protector apparatus.

15. The plant protector apparatus of claim 14 wherein the first attachment area extends around the robust shell parallel to the second attachment area.

16. The plant protector apparatus of claim 15 further comprising:

a vertical stake extending perpendicular to first attachment area and secured to the robust shell.

17. The plant protector apparatus of claim 14 further comprising:

the degradable covering secured to the robust shell at a third attachment area; and the robust shell having a plurality of apertures, the plurality of apertures located between the second attachment area and the third attachment area.

18. The plant protector apparatus of claim 14 wherein the shell includes an upper solid region adjacent to the top end, and a lower solid region adjacent to the lower end; and all of the plurality of holes are spaced apart from both the top end and the bottom end, and located between the upper solid region and the lower solid region.

19. The plant protector apparatus of claim 14 wherein the degradable covering has a first thickness between 1 millimeters and 2 millimeters at the first attachment area, and the degradable covering has a second thickness between 3 millimeters and 4 millimeters at the second attachment area.

* * * * *